US012179551B2

(12) United States Patent
Shi et al.

(10) Patent No.: US 12,179,551 B2
(45) Date of Patent: Dec. 31, 2024

(54) HEAT MANAGEMENT SYSTEM OF VEHICLE

(71) Applicants:Hyundai Motor Company, Seoul (KR); Kia Corporation, Seoul (KR)

(72) Inventors: Ze Wen Shi, Shandong (CN); Dal Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 205 days.

(21) Appl. No.: 17/897,908

(22) Filed: Aug. 29, 2022

(65) Prior Publication Data

US 2023/0211643 A1     Jul. 6, 2023

(30) Foreign Application Priority Data

Dec. 31, 2021   (CN) .......................... 202111657685.3

(51) Int. Cl.
*B60H 1/00*      (2006.01)
*B60H 1/03*      (2006.01)

(52) U.S. Cl.
CPC ..... *B60H 1/00278* (2013.01); *B60H 1/00342* (2013.01); *B60H 1/03* (2013.01); *B60H 2001/00307* (2013.01)

(58) Field of Classification Search
CPC .. B60H 1/00278; B60H 1/00342; B60H 1/03; B60H 2001/00307; H01M 6/5038
See application file for complete search history.

(56) References Cited

U.S. PATENT DOCUMENTS

2021/0309070 A1 * 10/2021  Ishizeki ............. B60H 1/00921

FOREIGN PATENT DOCUMENTS

KR      101846924 B1 *  5/2018  .............. B60L 58/26
WO  WO-2020031569 A1 *  2/2020  ......... B60H 1/00278

OTHER PUBLICATIONS

English language translation of KR101846924. Translated May 2024 (Year: 2018).*

* cited by examiner

*Primary Examiner* — Cassey D Bauer
(74) *Attorney, Agent, or Firm* — Fox Rothschild LLP

(57) ABSTRACT

Provided is a heat management system of a vehicle including: a cooling circuit including a radiator, a first valve, a first pump, and at least one electric part which are connected through a cooling water line; a battery cooling circuit including a second pump and a battery module which are connected through a battery cooling water line; a chiller installed in the battery cooling water line between the second pump and the battery module, and connected to a refrigerant line of an air-conditioning device through a refrigerant connection line; a first cooling water connection line; and a second cooling water connection.

18 Claims, 12 Drawing Sheets

HEAT MANAGEMENT SYSTEM OF VEHICLE

CROSS-REFERENCE TO RELATED APPLICATION

This application is based on and claims under 35 U.S.C. § 119(a) the benefit of Chinese Patent Application No. 202111657685.3 filed in the Chinese National Intellectual Property Administration on Dec. 31, 2021, the entire contents of which are incorporated herein by reference.

TECHNICAL FIELD

The present disclosure relates to a heat management system of a vehicle, and more particularly, to a heat management system of a vehicle, which enhances heating efficiency by using waste heat generated from electric parts.

BACKGROUND

With the continuous development of electric vehicles, consumers' demands for vehicle safety and cruising capacities are increasing day by day. The most important part of the safety and cruising capacities of the electric vehicles is a high-voltage battery. Heat management system of various vehicles for the electric vehicles in the related art, which cool the electric parts at high temperature and meet a cruising demand at low temperature have been researched and developed. Cooling methods are mainly natural cooling, air-cooling, water-cooling, refrigerant direct cooling, etc. Among them, the most applied cooling method is the water cooling. All respective companies have researched and developed various water-cooling systems. For example, Tesla which initially uses "Supper Bottle (internally integrated 5-way valve) can implement a comparatively long driving distance by using residual heat of a vehicle at low temperature. Further, Geometry C and Xiaopeng p7 which are newly launched in a Chinese market can control a flow direction of a cooling liquid by using one 4-way valve. Under a low-temperature condition, a cooling circuit is integrated into an integrated closed circuit to transfer the waste heat of the electric part (e.g., an engine, an inverter, etc.) to a battery module, thereby enhancing a temperature of the battery module. Under a high-temperature condition, since each cooling circuit forms a single closed circuit, cooling of the battery module is implemented by driving a cooling system of the battery module. Besides, other low-cost cooling system schemes are provided. For example, BYD HAN EV requires only a single cooling circuit without a need for a valve part.

In respect to technology of heat management systems of vehicles developed by many companies in the related art, since some companies develop high-performance heat management systems of the vehicles by targeting enhancement of driving satisfactions of consumers, the cost of the vehicle is increased. Some other companies target cost reduction, so low-temperature fuel efficiency of the vehicle is not good. Therefore, a heat management system of the vehicle is required, which can meet the cruising capability at the low temperature and at the same time, can also additionally reduce the cost.

The above information disclosed in this Background section is only for enhancement of understanding of the background of the disclosure, and therefore it may contain information that does not form the preexisting technology that is already known in this country to a person of ordinary skill in the art.

SUMMARY

One exemplary embodiment of the present disclosure has been made in an effort to provide a heat management system of a vehicle at low cost by using waste heat of electric parts.

An exemplary embodiment of the present disclosure may provide a heat management system of a vehicle, and the heat management system may include a cooling circuit, a battery cooling circuit, a chiller, a first cooling water connection line, and a second cooling water connection line. The cooling circuit may include a radiator, a first valve, a first pump, and at least one electric part which are connected through a cooling water line to cool the at least one electric part installed on the cooling water line through cooling water circulated in the cooling water line. The battery cooling circuit may include a second pump and a battery module which are connected through a battery cooling water line to cool the battery module installed on the battery cooling water line through the cooling water circulated in the battery cooling water line. The chiller may be installed in the battery cooling water line between the second pump and the battery module and connected to a refrigerant line of an air-conditioning device through a refrigerant connection line to adjust a temperature of the cooling water through heat exchange between the cooling water supplied from the battery cooling water line and the refrigerant supplied from the air-conditioning device through the refrigerant connection line. The first cooling water connection line may have a first end connected to the cooling water line between at least one electric part and the radiator and a second end connected to the battery cooling water line between the battery module and the second pump to allow the cooling water passing through the at least one electric part to flow into the battery cooling water line through the battery cooling water line. The second cooling water connection line may have a first end connected to the battery cooling water line between the battery module and the second pump and a second end connected to the first valve to allow the cooling water passing through the battery module to flow into the cooling water line through the first valve. The first valve may be installed on the cooling water line between the radiator and the first pump to form an independent closed circuit in which the cooling water is circulated in each of the cooling circuit and the battery cooling circuit or an integrated closed circuit in which the cooling water is circulated in both the cooling circuit and the battery cooling circuit by operation of the first valve.

In certain aspects, the first valve may be a 3-way valve.

In some embodiments, the air-conditioning device may include a first expansion valve, an HVAC module, a compressor, a second expansion valve, and a first condenser which are connected through the refrigerant line. The HVAC module may include an evaporator, a second condenser, a throttle, and a blower, the evaporator may be installed in the refrigerant line downstream of the first expansion valve, the second condenser may be installed in the refrigerant line downstream of the compressor, and the throttle may be configured to allow air introduced through the blower to selectively pass through the second condenser or not to pass through the second condenser after passing through the evaporator. The first condenser may be installed on the refrigerant line between the second condenser and the evaporator and may be an external condenser installed outdoors. The compressor may be installed on the refrigerant line between the evaporator and the second condenser. The first expansion valve may be an electronic expansion valve, and may be installed on the refrigerant line between the first condenser and the evaporator so as to selectively expand the refrigerant supplied to the evaporator. The second expansion valve may be an electronic expansion valve, and may be installed on the refrigerant line upstream of the first condenser so as to selectively expand the refrigerant supplied to the first condenser.

The heat management system of the vehicle according to the exemplary embodiment of the present disclosure may further include an internal heat exchanger and a third expansion valve. The internal heat exchanger may be installed on the refrigerant line between the second condenser and the second expansion valve, and installed on the cooling water line between the at least one electric part and the radiator. The third expansion valve may be an electronic expansion valve, and may be installed on the refrigerant line between the second condenser and the internal heat exchanger so as to selectively expand the refrigerant passing through the third expansion valve.

In the heat management system of the vehicle according to the exemplary embodiment of the present disclosure, the air-conditioner device may further include a second valve, a first bypass line, a second bypass line, and a third valve. The second valve may be a 3-way valve, and may be installed on the refrigerant line between the second condenser and the second expansion valve. A first end of the first bypass line may be connected to the refrigerant line between the second condenser and the second expansion valve through the second valve, and a second end of the first bypass line may be connected to the refrigerant line between the evaporator and the compressor. A first end of the second bypass line may be connected to the refrigerant line between the third expansion valve and the internal heat exchanger, and a second end of the second bypass line may be connected to the refrigerant line between the first expansion valve and the evaporator. The third valve may be an opening/closing valve and is installed on the second bypass line.

In the heat management system of the vehicle according to the exemplary embodiment of the present disclosure, a first end of the refrigerant connection line may be connected to the refrigerant line between the first condenser and the first expansion valve, and a second end of the refrigerant connection line may be connected to the refrigerant line between the evaporator and the compressor. The heat management system of the vehicle may further include a fourth expansion valve. The fourth expansion valve may be installed on the refrigerant connection line, and expands refrigerant introduced into the chiller or is selectively closed to prevent the refrigerant from being introduced into the chiller.

In the heat management system of the vehicle according to the exemplary embodiment of the present disclosure, the battery cooling circuit may further include a battery heater installed on the battery cooling water line between the second pump and the battery module, and the cooling circuit may further include a liquid storage tank installed on the cooling water line between the at least one electric part and the radiator.

In the heat management system of the vehicle according to the exemplary embodiment of the present disclosure, when the battery module is heated by using the at least one electric part, the second cooling water connection line is opened and the cooling water line connected to the radiator is blocked by operating the first valve such that an integrated closed circuit in which the cooling water is circulated in both the cooling circuit and the battery cooling circuit is formed, the first pump and the second pump are operated to allow the cooling water to be circulated along the integrated closed circuit formed by the cooling circuit and the battery cooling circuit, and the cooling water of which temperature rises through the at least one electric part is supplied to the battery module along the cooling water line, the first cooling water connection line, and the battery cooling water line to heat the battery module.

In the heat management system of the vehicle according to the exemplary embodiment of the present disclosure, when the battery module is heated by using the at least one electric part and the battery heater, the second cooling water connection line is opened and the cooling water line connected to the radiator is blocked by operating the first valve such that the integrated closed circuit in which the cooling water is circulated in both the cooling circuit and the battery cooling circuit is formed, the first pump and the second pump are operated to allow the cooling water to be circulated along the integrated closed circuit formed by the cooling circuit and the battery cooling circuit, the battery heater is operated to heat the cooling water circulated through the battery cooling water line, and cooling water of which the temperature rises through the at least one electric part is supplied to the battery module along the cooling water line, the first cooling water connection line, and the battery cooling water line to heat the battery module.

In the heat management system of the vehicle according to the exemplary embodiment of the present disclosure, when the at least one electric part and the battery module are cooled, the second cooling water connection line is blocked and the cooling water line connected to the radiator is opened by operating the first valve such that an independent closed circuit in which the cooling water is circulated in each of the cooling circuit and the battery cooling circuit is formed, the first bypass line is blocked and the refrigerant line connected to the first condenser is opened by operating the second valve, the second bypass line is blocked by closing the third valve, in the cooling circuit, the first pump is operated so that the cooling water is circulated along the cooling water line, in the battery cooling circuit, the second pump is operated so that the cooling water is circulated along the battery cooling water line, the first expansion valve is closed, the second expansion valve is fully opened, the third expansion valve is operated to allow the refrigerant supplied to the internal heat exchanger via the second condenser to be expanded, and the fourth expansion valve is operated to allow the refrigerant supplied to the chiller through the refrigerant connection line to be expanded.

In the heat management system of the vehicle according to the exemplary embodiment of the present disclosure, when the at least one electric part and the battery module are cooled in a cooling mode of the vehicle, the second cooling water connection line is blocked and the cooling water line connected to the radiator is opened by operating the first valve such that the independent closed circuit in which the cooling water is circulated in each of the cooling circuit and the battery cooling circuit is formed, the first bypass line is blocked and the refrigerant line connected to the first condenser is opened by operating the second valve, the second bypass line is blocked by closing the third valve, in the cooling circuit, the first pump is operated so that the cooling water is circulated along the cooling water line, in the battery cooling circuit, the second pump is operated so that the cooling water is circulated along the battery cooling water line, the first expansion valve is operated to allow the refrigerant supplied to the evaporator via the first condenser to be expanded, the second expansion valve is fully opened, the third expansion valve is operated to allow the refrigerant supplied to the internal heat exchanger via the second condenser to be expanded, and the fourth expansion valve is operated to be allow the refrigerant supplied to the chiller through the refrigerant connection line to be expanded.

In the heat management system of the vehicle according to the exemplary embodiment of the present disclosure, when the battery module is heated by using the at least one electric part and a vehicle cabin is heated by recovering external heat in a heating mode of the vehicle, the second cooling water connection line is opened and the cooling water line connected to the radiator is blocked by operating the first valve such that the integrated closed circuit in which the cooling water is circulated in both the cooling circuit and the battery cooling circuit is formed, the first bypass line is blocked and the refrigerant line connected to the first condenser is opened by operating the second valve, the second bypass line is blocked by closing the third valve, the first pump and the second pump are operated to allow the cooling water to be circulated along the integrated closed circuit formed by the cooling circuit and the battery cooling circuit, the first expansion valve is fully opened, the second expansion valve is operated to allow the refrigerant supplied to the first condenser from the internal heat exchanger to be expanded, the third expansion valve is fully opened, and the fourth expansion valve is closed.

In the heat management system of the vehicle according to the exemplary embodiment of the present disclosure, when the battery module is heated by using the at least one electric part and the battery heater in the heating mode of the vehicle, the second cooling water connection line is opened and the cooling water line connected to the radiator is blocked by operating the first valve such that the integrated closed circuit in which the cooling water is circulated in both the cooling circuit and the battery cooling circuit is formed, the first bypass line is opened by operating the second valve, the refrigerant passing through the internal heat exchanger is supplied to the compressor through the first bypass line, the second bypass line is blocked by closing the third valve, the first pump and the second pump are operated to allow the cooling water to be circulated along the integrated closed circuit formed by the cooling circuit and the battery cooling circuit, the first expansion valve is closed, the second expansion valve is closed, the third expansion valve is fully opened, and the fourth expansion valve is closed.

In the heat management system of the vehicle according to the exemplary embodiment of the present disclosure, when the battery module is heated by using the at least one electric part and the vehicle cabin is heated by recovering the external heat in a heating and dehumidification mode of the vehicle, the second cooling water connection line is opened and the cooling water line connected to the radiator is blocked by operating the first valve such that the integrated closed circuit in which the cooling water is circulated in both the cooling circuit and the battery cooling circuit is formed, the first bypass line is blocked by operating the second valve, the second bypass line is blocked by closing the third valve, the first pump and the second pump are operated to allow the cooling water to be circulated along the integrated closed circuit formed by the cooling circuit and the battery cooling circuit, the first expansion valve is operated to allow the refrigerant supplied to the evaporator via the first condenser to be expanded, the second expansion valve is operated to allow the refrigerant supplied from the internal heat exchanger to the first condenser to be expanded, third expansion valve is fully opened, and the fourth expansion valve is closed.

In the heat management system of the vehicle according to the exemplary embodiment of the present disclosure, when the battery module is heated by using the at least one electric part and the battery heater in the heating and dehumidification mode of the vehicle, the second cooling water connection line is opened and the cooling water line connected to the radiator is blocked by operating the first valve such that the integrated closed circuit in which the cooling water is circulated in both the cooling circuit and the battery cooling circuit is formed, the first bypass line is blocked and the partial refrigerant line connected to the first condenser is blocked by operating the second valve, the third valve is opened to allow the refrigerant supplied via the second condenser to be supplied to the evaporator through the second bypass line, the first pump and the second pump are operated to allow the cooling water to be circulated along the integrated closed circuit formed by the cooling circuit and the battery cooling circuit, the first expansion valve is closed, the second expansion valve is closed, the third expansion valve is operated to allow the refrigerant passing through the second condenser to be expanded, and the fourth expansion valve is closed.

In the heat management system of the vehicle according to the exemplary embodiment of the present disclosure, the HVAC module may further include an air heater selectively heating the air introduced into the vehicle.

In the heat management system of the vehicle according to the exemplary embodiment of the present disclosure, the at least one electric part may include a power control unit, a motor, an inverter, or an on-board charger.

Other features and advantages of the method and the apparatus of the present disclosure will be apparent in the drawings included in the text and the following detailed embodiment or specifically described in the drawings included in the text and the following detailed embodiment, and the drawings and the detailed embodiments are all used for describing a partial principle of the present disclosure.

According to an exemplary embodiment of the present disclosure, the cooling circuit and the battery cooling circuit are connected as the integrated closed circuit through one 3-way valve to heat the battery module by using waste heat of the electric parts, thereby enhancing heating efficiency. Further, the battery module is cooled by using the chiller to effectively adjust the temperature of the battery module. The performance of the battery module can be optimized by effectively adjusting the temperature of the battery module, and a total driving distance can be increased through effective management for the battery module.

As discussed, the method and system suitably include use of a controller or processor.

In another embodiment, vehicles are provided that comprise an apparatus as disclosed herein.

Besides, an effect which can be obtained or predicted by the exemplary embodiment of the present disclosure is directly or implicitly disclosed in the detailed description of the exemplary embodiment of the present disclosure. That is, various effects predicted according to the exemplary embodiment of the present disclosure will be disclosed in the detailed description to be described below.

Figure 1:
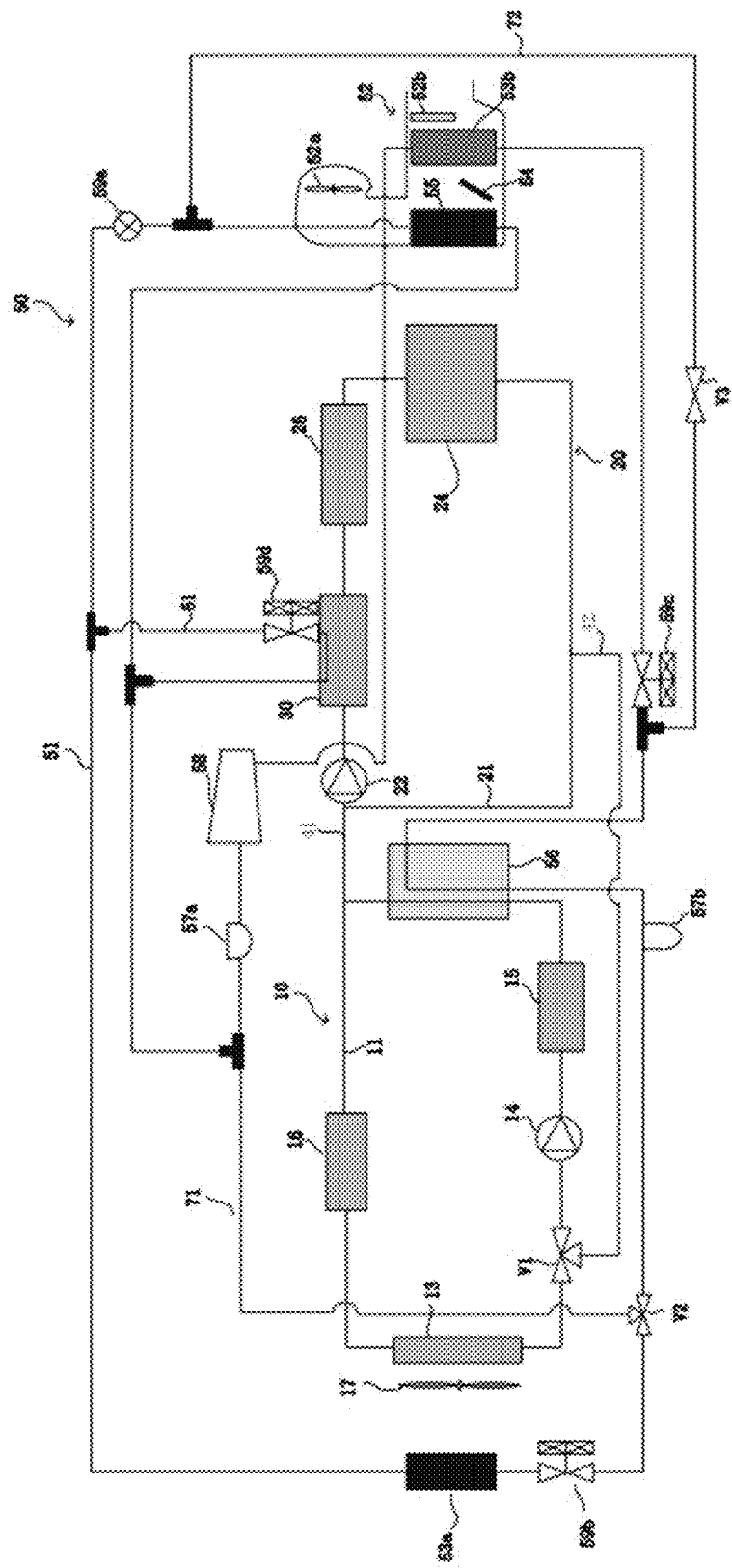
FIG. 1 is a schematic view illustrating a heat management system of a vehicle according to an exemplary embodiment of the present disclosure.

For reference, the drawings are not written according to the ratio, but simplified the various features that describe the basic principles of the present disclosure. For example, the specific design features of the present disclosure included in a specification containing certain size, direction, position and shape may be partially determined according to the specific application and environment.

DETAILED DESCRIPTION

Hereinafter, each embodiment of the present disclosure will be referred to in detail, and an example of the exemplary embodiment is illustrated in the drawings, and described as follows. Although the present disclosure is described by combining the exemplary embodiment of the present disclosure, the present disclosure must be understood that the present disclosure is not intended to be limited to such an exemplary embodiment. On the other hand, the present disclosure not only comprises an exemplary embodiment of the present disclosure, but also further comprises a variety of alternative embodiments, corrected embodiments, equivalent embodiments, and other embodiments, and the exemplary embodiment is limited to the spirit and the scope of the present disclosure limited in the claims.

Hereinafter, various exemplary embodiments of the present disclosure will be described in more detail with reference to the drawings.

Prior to this, configurations illustrated in the exemplary embodiments and drawings disclosed in the present specification are only the most preferred embodiment of the present disclosure and do not represent all of the technical spirit of the present disclosure, and thus it is to be understood that various equivalents and modified examples, which may replace the configurations, are possible when filing the present application.

In order to clearly describe the present disclosure, the absence not related to the description is omitted, and in the entire specification, the same or similar components are represented by the same reference numeral.

Since the size and thickness of each configuration shown in the drawing is arbitrarily indicated for the convenience of the description, the present disclosure is not limited to the configuration shown in the drawing. Further, the thickness is enlarged and displayed in order to clearly express various parts and regions.

In addition, throughout the specification, unless explicitly described to the contrary, the word "comprise", and variations such as "comprises" or "comprising", will be understood to imply the inclusion of stated elements but not the exclusion of any other elements.

In addition, terms described in the specification, e.g., "unit", "device", "member", and "component" means a unit of a comprehensive configuration that performs at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a heat management system of a vehicle according to an exemplary embodiment of the present disclosure will be described in detail with reference to FIG. 1. FIG. 1 is a schematic view illustrating a heat management system of a vehicle according to an exemplary embodiment of the present disclosure. In the heat management system of the vehicle according to an exemplary embodiment of the present disclosure, a cooling circuit and a battery cooling circuit are connected as an integrated closed circuit through one 3-way valve to heat up a battery module by using waste heat of electric parts, thereby enhancing heating efficiency. Further, since the battery module is cooled by using a chiller, a temperature of the battery module can be effectively adjusted. Further, the heating efficiency may be enhanced by recovering heat of external air. The heat management system is suitable for an electric vehicle.

The heat management system of the vehicle may include a cooling circuit 10, a battery cooling circuit 20, and a chiller 30.

In the exemplary embodiment of the present disclosure, the cooling circuit 10 may include a radiator 13, a first valve V1, a first pump 14, and an electric part 15, which are connected to each other through a cooling water line 11.

The radiator 13 may be mounted on a front of the vehicle and a cooling fan 17 may be mounted on a front of radiator 13 such that cooling water circulated through the cooling water line 11 is cooled through heat-exchange with external air in the radiator 13 by operating the cooling fan 17.

The first valve V1 may be a 3-way valve and may be installed on the cooling water line 11 between the radiator 13 and the first pump 14. It is allowed to form an independent closed circuit in which the cooling water is circulated in each of the cooling circuit 10 and the battery cooling circuit 20 or an integrated closed circuit in which the cooling water is circulated in both the cooling circuit 10 and the battery cooling circuit 20 by operating the first valve V1.

The cooling circuit 10 may circulate the cooling water in the cooling water line 11 by operating the first pump 14 to supply the cooling water to the electric part 15.

The electric part 15 may be installed on the cooling water line 11 and may be cooled by using the cooling water circulating through the cooling circuit 10. The electric part 15 may include a power control unit, a motor, an inverter, or an on-board charger. Accordingly, when the battery module should be heated up in a low-temperature environment, the battery module is heated up by recovering waste heat generated by the electric part such as the power control unit, the motor, the inverter, or the charger, thereby increasing the heating efficiency.

Further, the cooling circuit 10 may further include a liquid storage tank 16 installed on the cooling water line 11 between the electric part 15 and the radiator 13, and supplements the cooling water into the cooling water line 11.

In the exemplary embodiment of the present disclosure, the battery cooling circuit 20 may include a second pump 22 and a battery module 24, which are connected to each other through a battery cooling water line 21.

The battery cooling circuit 20 may circulate the cooling water in the battery cooling water line 21 by operating the second pump 22 to supply the cooling water to the battery module 24.

Here, the first pump 14 and the second pump 22 may be electric pumps.

Further, the battery cooling circuit 20 may further include a battery heater 26 installed on the battery cooling water line 21 between the second pump 22 and the battery module 24. When a temperature of the cooling water supplied to the battery module 24 is lower than a target temperature, the battery heater 26 may be used. The battery heater 26 operates to heat up the cooling water circulated in the battery cooling water line 21. That is, when the battery module 24 should be heated up, the battery heater 26 may be selectively operated according to the temperature of the battery module.

In the exemplary embodiment of the present disclosure, the chiller 30 may be installed on the battery cooling water line 21 between the second pump 22 and the battery module 24 and is connected to a refrigerant line 51 of an air-conditioning device 50 through a refrigerant connection line 61. Refrigerant supplied from the air-conditioning device 50 through the refrigerant connection line 61 is expanded through a fourth expansion valve 59*d*, and the cooling water circulated through the battery cooling water line 21 evaporates the refrigerant expanded in the chiller 30, and at the same time, the temperature of the cooling water is lowered. Thereafter, the cooled cooling water is supplied to the battery module 24 to cool the battery module 24. The chiller 30 may be a water-cooled heat exchanger into which the cooling water flows.

In the exemplary embodiment of the present disclosure, the air-conditioning device 50 may include a first expansion valve 59*a*, an HVAC module 52, a gas-liquid separator 57*a*, a compressor 58, a second expansion valve 59*b*, and a first condenser 53*a*, which are connected to each other through the refrigerant line 51.

The HVAC module 52 may include an evaporator 55, a second condenser 53*b*, a throttle 54, and a blower 52*a*.

The evaporator 55 may be installed on the refrigerant line 51 downstream of the first expansion valve 59*a*, and may be positioned inside the HVAC module 52. Air flowing into the HVAC module 52 through the blower 52*a* first passes through the evaporator 55.

The second condenser 53*b* may be installed on the refrigerant line 51 downstream of the compressor 58, and may be positioned inside the HVAC module 52. The air flowing into the HVAC module 52 through the blower 52*a* passes through the evaporator 55 and then may selectively pass through the second condenser 53*b*.

The throttle 54 may be positioned between the evaporator 55 and the second condenser 53*b* inside the HVAC module 52. The throttle 54 is configured so that the air flowing into the HVAC module 52 through the blower 52a passes through the evaporator 55, and then passes through the second condenser 53b or bypasses the second condenser 53b according to a cooling mode, a heating mode, and a heating and dehumidification mode of the vehicle. Specifically, when an inside of the vehicle should be heated up, the throttle 54 is configured so that the intake air passes through the evaporator 55, and then passes through the second condenser 53b, and when the inside of the vehicle need not be heated up, the throttle 54 is configured so that the intake air passes through the evaporator 55, and then bypasses the second condenser 53b.

The blower 52a may be used to blow the air into the HVAC module 52.

In the exemplary embodiment of the present disclosure, the HVAC module 52 may further include an air heater 52b positioned in a rear of the second condenser 53b inside the HVAC module 52. When the inside of the vehicle is heated up, if the temperature of the air passing through the second condenser 53b is lower than a target temperature, the air heater 52b may be used. The air heater 52b operates to separately heat up the air flowing into the vehicle.

The first condenser 53a may be installed on the refrigerant line 51 between the second condenser 53b and the evaporator 55. The first condenser 53a is an external condenser installed outdoors.

Here, the first condenser 53a and the second condenser 53b may be air-cooled heat exchangers.

The gas-liquid separator 57a may be installed on the refrigerant line 51 between the evaporator 55 and the compressor 58, and may be used for separating a gaseous refrigerant and a liquid refrigerant in the refrigerant supplied to the compressor 58 and supplying the gaseous refrigerant to the compressor 58.

The compressor 58 may be installed on the refrigerant line 51 between the evaporator 55 and the second condenser 53b to circulate the refrigerant in the refrigerant line 51. The compressor 58 may compress the gaseous refrigerant and supply the compressed refrigerant to the second condenser 53b.

The first expansion valve 59a may be an electronic expansion valve, and is installed on the refrigerant line 51 between the first condenser 53a and the evaporator 55. The first expansion valve 59a is closed so that a partial refrigerant line 51 connected to the evaporator 55 is blocked, is operated so that the refrigerant supplied to the evaporator 55 is expanded, or is fully opened so that the refrigerant supplied to the evaporator 55 passes, but is not expanded.

The second expansion valve 59b may be an electronic expansion valve, and is installed on the refrigerant line 51 upstream of the first condenser 53a. The second expansion valve 59b is closed so that a partial refrigerant line 51 connected to the first condenser 53a is blocked, is operated so that the refrigerant supplied to the first condenser 53a is expanded, or is fully opened so that the refrigerant supplied to the first condenser 53a passes, but is not expanded. When the second expansion valve 59b is operated so that the refrigerant supplied to the first condenser 53a is expanded, the first condenser 53a may be used as an evaporator so as to absorb the heat of the external air.

In the exemplary embodiment of the present disclosure, the heat management system of the vehicle may further include an internal heat exchanger 56 and a third expansion valve 59c.

The internal heat exchanger 56 may be installed on the refrigerant line 51 between the second condenser 53b and the second expansion valve 59b, and installed on the cooling water line 11 between the electric part 15 and the radiator 13.

The third expansion valve 59c may be an electronic expansion valve, and is installed on the refrigerant line 51 between the second condenser 53b and the internal heat exchanger 56. The third expansion valve 59c is operated so that the refrigerant passing through the third expansion valve 59c is expanded or is fully opened so that the refrigerant passing through the third expansion valve 59c is not expanded.

In the internal heat exchanger 56, the refrigerant supplied from the second condenser 53b through the refrigerant line 51 only may pass and not be expanded when passing through the third expansion valve 59c, and the cooling water of which temperature rises via the electric part 15 in the cooling water line 11 may further condense the refrigerant supplied from the second condenser 53b and at the same time, the temperature of the cooling water may further rise. Thereafter, the cooling water of which temperature further rises is supplied to the battery module 24 through a first cooling water connection line 41 and heats up the battery module 24. Alternatively, the refrigerant supplied from the second condenser 53b through the refrigerant line 51 is expanded while passing through the third expansion valve 59c, and the temperature of the refrigerant is lowered. In this case, since the temperatures of the cooling water rising through the electric part 15 in the cooling water line 11 and the temperature of the expanded refrigerant are similar in the internal heat exchanger 56, heat exchange between both the cooling water and the refrigerant does not occur. Alternatively, when the electric part 15 is overheated, the cooling water of which the temperature rises through the electric part 15 in the cooling water line 11 evaporates the expanded refrigerant, and at the same time, the temperature of the cooling water is lowered. In this case, the cooling water is cooled through the radiator 13 and is additionally cooled by the refrigerant by using the internal heat exchanger 56. Here, the internal heat exchanger 56 may be a water-cooled heat exchange into which the cooling water flows.

Further, the air-conditioner device 50 may further include a second valve V2, a first bypass line 71, a second bypass line 72, and a third valve V3.

The second valve V2 may be a 3-way valve, and is installed on the refrigerant line 51 between the second condenser 53b and the second expansion valve 59b.

A first end of the first bypass line 71 may be connected to the refrigerant line 51 between the second condenser 53b and the second expansion valve 59b through the second valve V2 and a second end of the first bypass line 71 may be connected to the refrigerant line 51 between the evaporator 55 and the compressor 58. The first bypass line 71 may be opened or blocked by operation of the second valve V2.

A first end of the second bypass line 72 may be connected to the refrigerant line 51 between the third expansion valve 59c and the internal heat exchanger 56, and a second end of the second bypass line 72 may be connected to the refrigerant line 51 between the first expansion valve 59a and the evaporator 55.

The third valve V3 may be an opening/closing valve and may be installed on the second bypass line 72, and the second bypass line 72 may be opened or blocked by operation of the third valve V3.

Here, a first end of the refrigerant connection line 61 may be connected to the refrigerant line 51 between the first condenser 53a and the first expansion valve 59a and a second end of the refrigerant connection line 61 may be connected to the refrigerant line 51 between the evaporator 55 and the compressor 58 to supply the refrigerant passing through the first condenser 53a to the chiller 30 through the refrigerant connection line 61.

In the exemplary embodiment of the present disclosure, the heat management system of a vehicle may further include the fourth expansion valve 59d installed on the refrigerant connection line 61. The fourth expansion valve 59d is closed so that the refrigerant connection line 61 is blocked or is opened so that the refrigerant flowing into the chiller 30 is expanded.

In the exemplary embodiment of the present disclosure, the air-conditioning device 50 may further include a refrigerant storage tank 57b, and the refrigerant storage tank 57b may be installed downstream of the internal heat exchanger 56 and store a liquid component in the refrigerant which flows out the internal heat exchanger 56 to reduce a load of the first condenser 53a and reduce noise.

Figure 10:
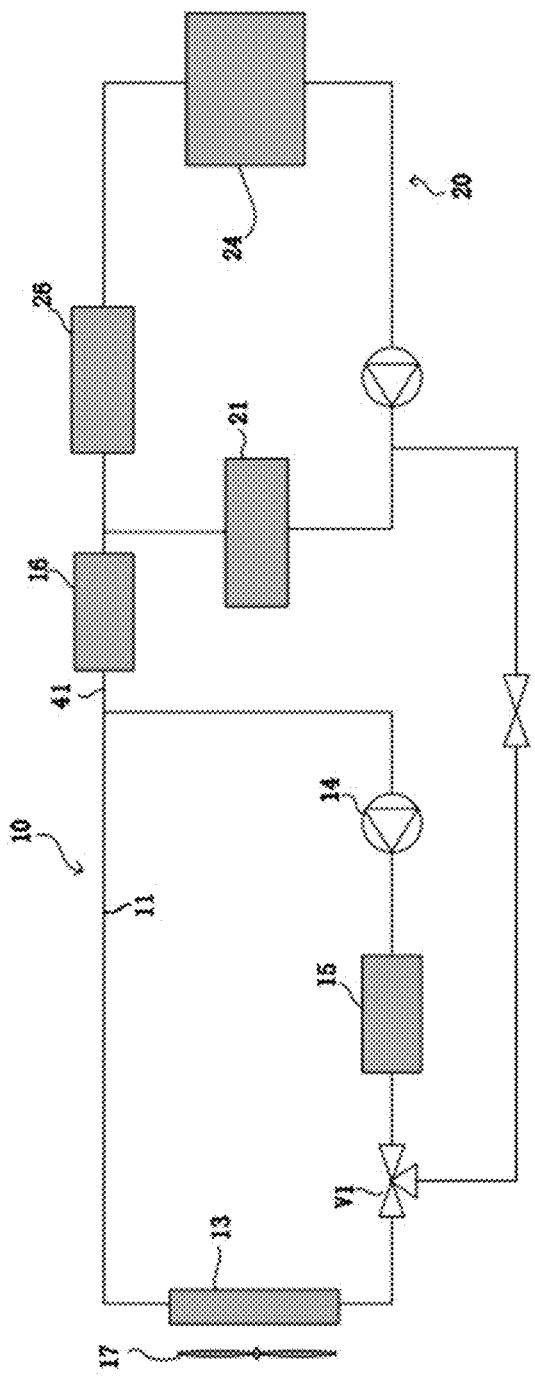
FIG. 10 is a partial schematic view illustrating a heat management system of a vehicle according to another exemplary embodiment of the present disclosure.

As illustrated in FIG. 10, in another exemplary embodiment of the present disclosure, the liquid storage tank 16 may be installed on the first cooling water connection line 41 to supplement the cooling water into the cooling water line 11 and the battery cooling water line 21.

Figure 11:
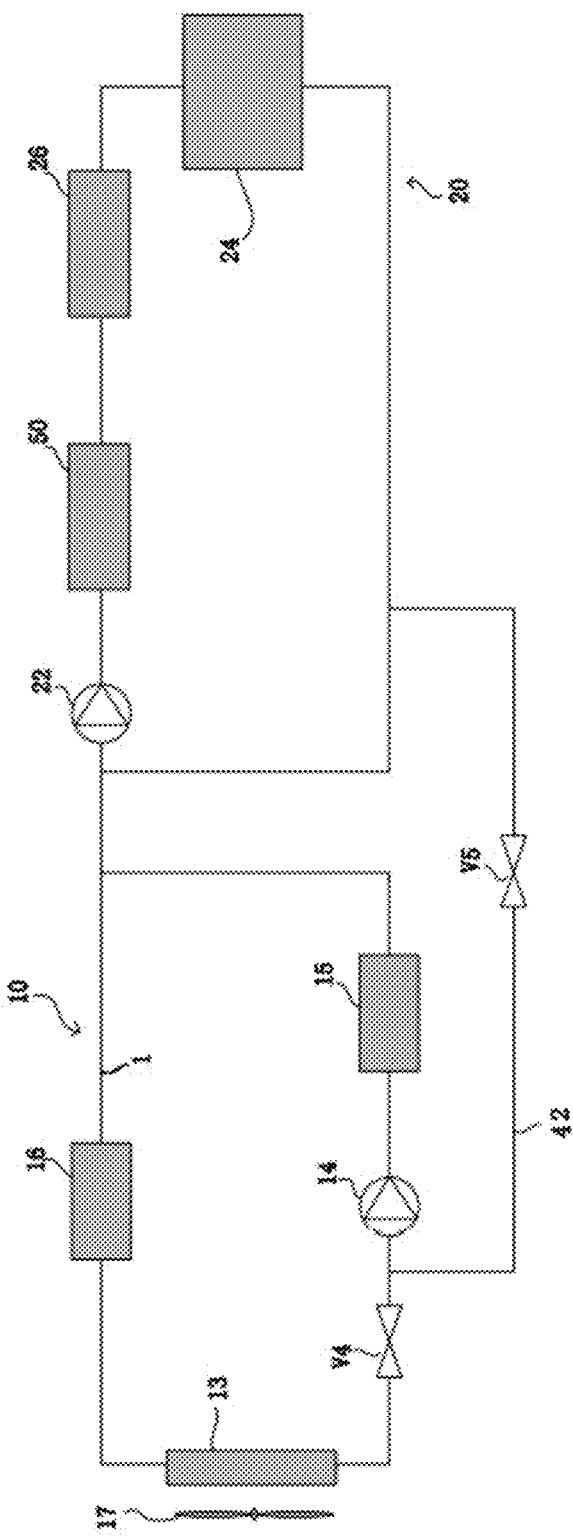
FIG. 11 is a partial schematic view illustrating a heat management system of a vehicle according to yet another exemplary embodiment of the present disclosure.

As illustrated in FIG. 11, in another exemplary embodiment of the present disclosure, the first valve V1 which is the 3-way valve may be replaced with a fourth valve V4 and a fifth valve V5 which are two opening/closing valves. The fourth valve V4 is installed on the cooling water line 11 between the radiator 13 and the first pump 14, and the fifth valve V5 is installed on a second cooling water connection line 42. In this case, a second end of the second cooling water connection line 42 is connected to the cooling water line 11 between the fourth valve V4 and the first pump 14. The fourth valve V4 and the fifth valve V5 are operated to form the independent closed circuit in which the cooling water is circulated in each of the cooling circuit 10 and the battery cooling circuit 20 or the integrated closed circuit in which the cooling water is circulated in both the cooling circuit 10 and the battery cooling circuit 20. Specifically, when the fourth valve V4 is opened and the fifth valve V5 is closed, the independent closed circuit is formed in which the cooling water is circulated in each of the cooling circuit 10 and the battery cooling circuit 20. When the fourth valve V4 is closed and the fifth valve V5 is opened, the integrated closed circuit is formed in which the cooling water is circulated in both the cooling circuit 10 and the battery cooling circuit 20.

Hereinafter, an operation state of the heat management system of the vehicle according to the exemplary embodiment of the present disclosure configured as described above will be described in detail with reference to FIGS. 2 to 9.

Figure 2:
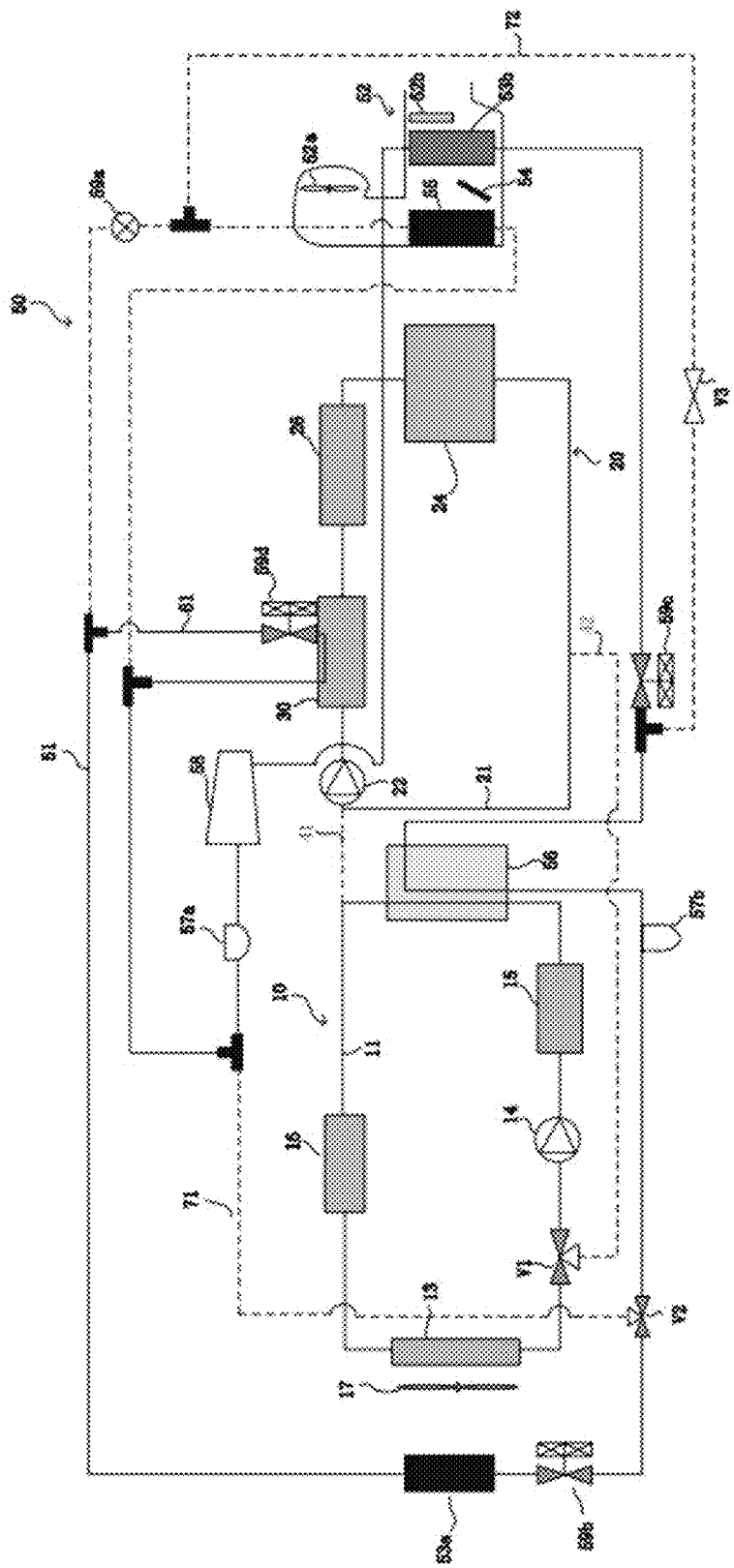
FIG. 2 is an operation state diagram illustrating that a heat management system of a vehicle cools electric parts and a battery module according to an exemplary embodiment of the present disclosure.

First, an exemplary operation in which the heat management system of the vehicle according to the exemplary embodiment of the present disclosure cools the electric part 15 and the battery module 24 will be described with reference to FIG. 2. FIG. 2 is an operation state diagram illustrating that the heat management system of the vehicle cools the electric parts and the battery module according to the exemplary embodiment of the present disclosure.

Referring to FIG. 2, the second cooling water connection line 42 may be blocked and a partial cooling water line 11 connected to the radiator 13 may be opened by operating the first valve V1 to allow the independent closed circuit in which the cooling water is circulated in each of the cooling circuit 10 and the battery cooling circuit 20 to be formed.

In this state, in the cooling circuit 10, the first pump 14 may be operated to circulate the cooling water along the cooling water line 11. Specifically, the cooling water of which the temperature rises through the electric part 15 is cooled when passing through the radiator 13, and then the cooled cooling water is supplied back to the electric part 15 to cool the electric part 15.

In the battery cooling circuit 20, the second pump 22 may be operated to circulate the cooling water along the battery cooling water line 21. Specifically, the cooling water of which the temperature rises through the battery module 24 evaporates the refrigerant supplied to the chiller 30 through the refrigerant connection line 61 when passing through the chiller 30, and at the same time, the temperature of the cooling water is lowered. Thereafter, the cooling water of which the temperature is lowered is supplied back to the battery module 24 to cool the battery module 24.

The first bypass line 71 may be blocked and the refrigerant line 51 connected to the first condenser 53a may be opened by operating the second valve V2 to supply the refrigerant supplied from the second condenser 53b to the first condenser 53a.

The third valve V3 may be closed to block the second bypass line 72.

The first expansion valve 59a may be closed so that the refrigerant supplied from the first condenser 53a does not pass through the evaporator 55, the second expansion valve 59b is fully opened so that the refrigerant supplied from the internal heat exchanger 56 to the first condenser 53a passes, but is not expanded, and the third expansion valve 59c is operated so that the refrigerant supplied from the second condenser 53b to the internal heat exchanger 56 is expanded.

In this state, while the refrigerant supplied from the second condenser 53b through the refrigerant line is expanded while passing through the third expansion valve 59c, the temperature of the refrigerant may be lowered. In this case, since the temperatures of the cooling water which rises through the electric part 15 in the cooling water line and the temperature of the expanded refrigerant are similar in the internal heat exchanger 56, the heat exchange between both the cooling water and the refrigerant does not occur. When the electric part 15 is overheated, the cooling water of which the temperature rises through the electric part 15 in the cooling water line evaporates the expanded refrigerant, and at the same time, the temperature of the cooling water is lowered. Accordingly, the cooling water is cooled through the radiator 13 and is additionally cooled by the refrigerant by using the internal heat exchanger 56 to enhance the cooling efficiency.

The fourth expansion valve 59d may be operated so that the refrigerant supplied to the chiller 30 through the refrigerant connection line 61 is expanded.

In this state, the refrigerant supplied from the second condenser 53b through the refrigerant connection line 61 may be expanded through the fourth expansion valve 59d, and the cooling water circulating through the battery cooling water line 21 may evaporate the refrigerant expanded in the chiller 30, and at the same time, the temperature of the cooling water may be lowered.

In the HVAC module 52, while the blower 52a is turned off, the air may not flow into the HVAC module 52.

Consequently, in the circulation process of the cooling water and the refrigerant, the cooling water of the battery cooling circuit may be cooled by using evaporation of the refrigerant in the chiller 30 to cool the battery module. Further, since the cooling water of the cooling circuit is cooled by using the evaporation of the refrigerant in the internal heat exchanger 56, the electric part may be additionally cooled, which is advantageous for enhancement of the cooling efficiency.

Figure 3:
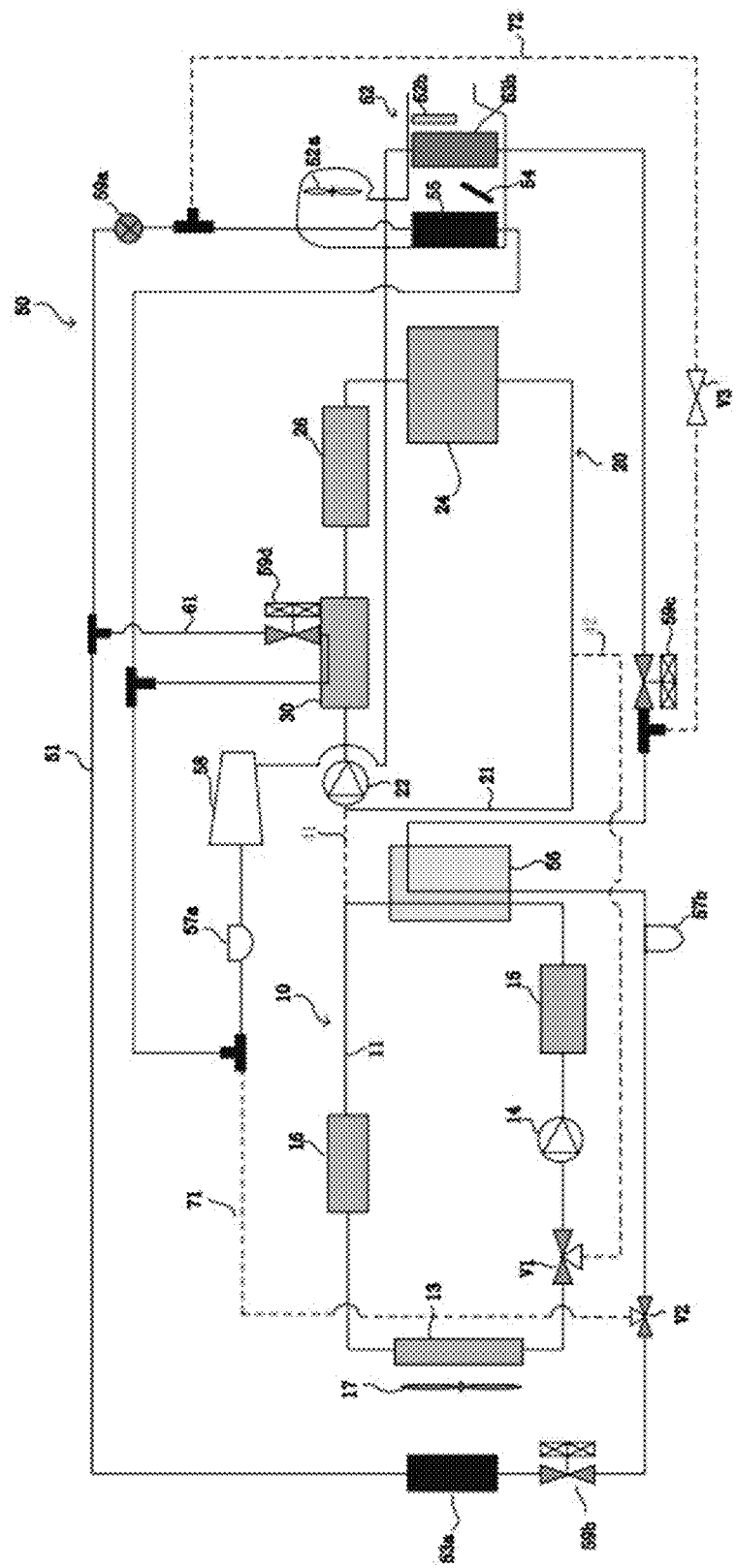
FIG. 3 is an operation state diagram illustrating that a heat management system of a vehicle cools electric parts and a battery module in a cooling mode of the vehicle according to an exemplary embodiment of the present disclosure.

An exemplary operation in which the heat management system of the vehicle according to the exemplary embodiment of the present disclosure cools the electric part 15 and the battery module 24 in a cooling mode of the vehicle will be described with reference to FIG. 3. FIG. 3 is an operation state diagram illustrating that the heat management system of the vehicle cools the electric parts and the battery module in the cooling mode according to the exemplary embodiment of the present disclosure.

Referring to FIG. 3, the second cooling water connection line 42 may be blocked and the partial cooling water line 11 connected to the radiator 13 may be opened by operating the first valve V1 to allow the independent closed circuit in which the cooling water is circulated in each of the cooling circuit 10 and the battery cooling circuit 20 to be formed.

In this state, in the cooling circuit 10, the first pump 14 may be operated to circulate the cooling water along the cooling water line 11. Specifically, the cooling water of which the temperature rises through the electric part 15 is cooled when passing through the radiator 13, and then the cooled cooling water is supplied back to the electric part 15 to cool the electric part 15.

In the battery cooling circuit 20, the second pump 22 may be operated to circulate the cooling water along the battery cooling water line 21. Specifically, the cooling water of which the temperature rises through the battery module 24 evaporates the refrigerant supplied to the chiller 30 through the refrigerant connection line 61 when passing through the chiller 30, and at the same time, the temperature of the cooling water is lowered. Thereafter, the cooling water of which the temperature is lowered is supplied back to the battery module 24 to cool the battery module 24.

The first bypass line 71 may be blocked and the refrigerant line connected to the first condenser 53a may be opened by operating the second valve V2 to supply the refrigerant supplied from the second condenser 53b to the first condenser 53a.

The third valve V3 may be closed to block the second bypass line 72.

The first expansion valve 59a may operate so that the refrigerant supplied from the first condenser 53a to the evaporator 55 is expanded, the second expansion valve 59b may be fully opened so that the refrigerant supplied from the internal heat exchanger 56 to the first condenser 53a passes, but is not expanded, and the third expansion valve 59c may be operated so that the refrigerant supplied from the second condenser 53b to the internal heat exchanger 56 is expanded.

In this state, while the refrigerant supplied from the second condenser 53b through the refrigerant line is expanded while passing through the third expansion valve 59c, the temperature of the refrigerant may be lowered. In this case, since the temperatures of the cooling water which rises through the electric part 15 in the cooling water line and the temperature of the expanded refrigerant are similar in the internal heat exchanger 56, the heat exchange between both the cooling water and the refrigerant does not occur. When the electric part 15 is overheated, the cooling water of which the temperature rises through the electric part 15 in the cooling water line evaporates the expanded refrigerant, and at the same time, the temperature of the cooling water is lowered. Accordingly, the cooling water is cooled through the radiator 13 and is additionally cooled by the refrigerant by using the internal heat exchanger 56 to enhance the cooling efficiency.

The fourth expansion valve 59d may be operated so that the refrigerant supplied to the chiller 30 through the refrigerant connection line 61 is expanded.

In this state, the refrigerant supplied from the second condenser 53b through the refrigerant connection line 61 may be expanded through the fourth expansion valve 59d, and the cooling water circulating through the battery cooling water line 21 may evaporate the refrigerant expanded in the chiller 30, and at the same time, the temperature of the cooling water may be lowered.

In the HVAC module 52, while the blower 52a is turned on, the air may flow into the HVAC module 52. At the same time, the throttle 54 controls the intake air not to pass through the second condenser 53b after passing through the evaporator 55.

Consequently, in the circulation process of the cooling water and the refrigerant, the cooling water of the battery cooling circuit may be cooled by using evaporation of the refrigerant in the chiller 30 to cool the battery module. Further, since the cooling water of the cooling circuit is cooled by using the evaporation of the refrigerant in the internal heat exchanger 56, the electric part is additionally cooled, which is advantageous for enhancement of the cooling efficiency.

Figure 4:
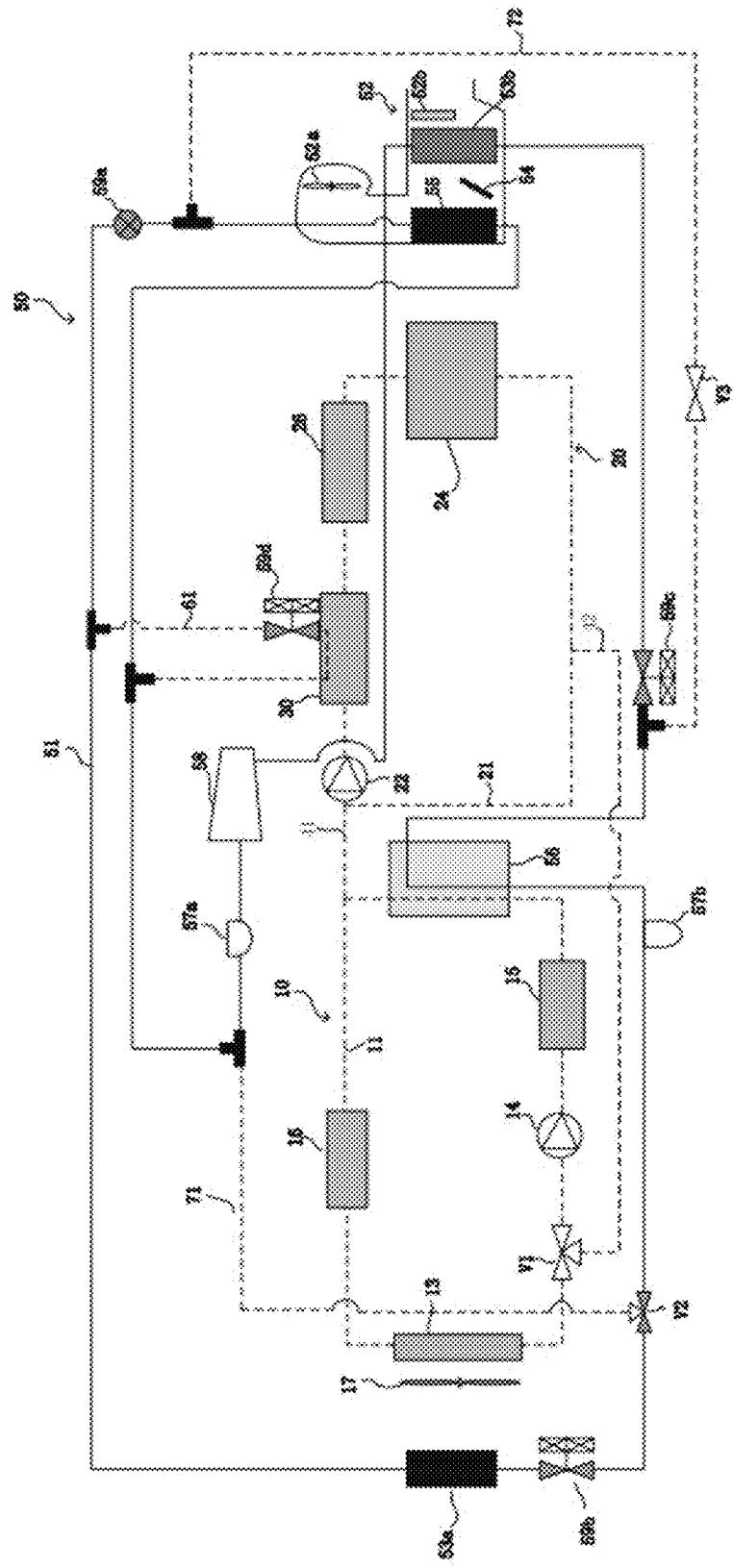
FIG. 4 is an operation state diagram illustrating a vehicle cooling mode of a heat management system of a vehicle according to an exemplary embodiment of the present disclosure.

An exemplary operation of the vehicle cooling mode of the heat management system of the vehicle according to the exemplary embodiment of the present disclosure will be described with reference to FIG. 4. FIG. 4 is an operation state diagram illustrating the vehicle cooling mode of the heat management system of the vehicle according to the exemplary embodiment of the present disclosure.

Referring to FIG. 4, the cooling circuit 10 and the battery cooling circuit 20 may not be operated.

The first bypass line 71 may be blocked and the refrigerant line connected to the first condenser 53a may be opened by operating the second valve V2 to supply the refrigerant supplied from the second condenser 53b to the first condenser 53a. The third valve V3 is closed to block the second bypass line 72. The fourth expansion valve 59d is closed to block the refrigerant connection line 61.

In the air-conditioning device 50, the first expansion valve 59a may be operated so that the refrigerant supplied from the first condenser 53a to the evaporator 55 is expanded, the second expansion valve 59b may be fully opened so that the refrigerant supplied from the internal heat exchanger 56 to the first condenser 53a passes, but is not expanded, and the third expansion valve 59c may be fully opened so that the refrigerant supplied from the second condenser 53b to the internal heat exchanger 56 passes, but is not expanded. The compressor 58 may be operated so that the refrigerant is circulated along the refrigerant line 51.

In the HVAC module 52, while the blower 52a is turned on, the air may flow into the HVAC module 52. At the same time, the throttle 54 controls the intake air not to pass through the second condenser 53b after passing through the evaporator 55.

Figure 5:
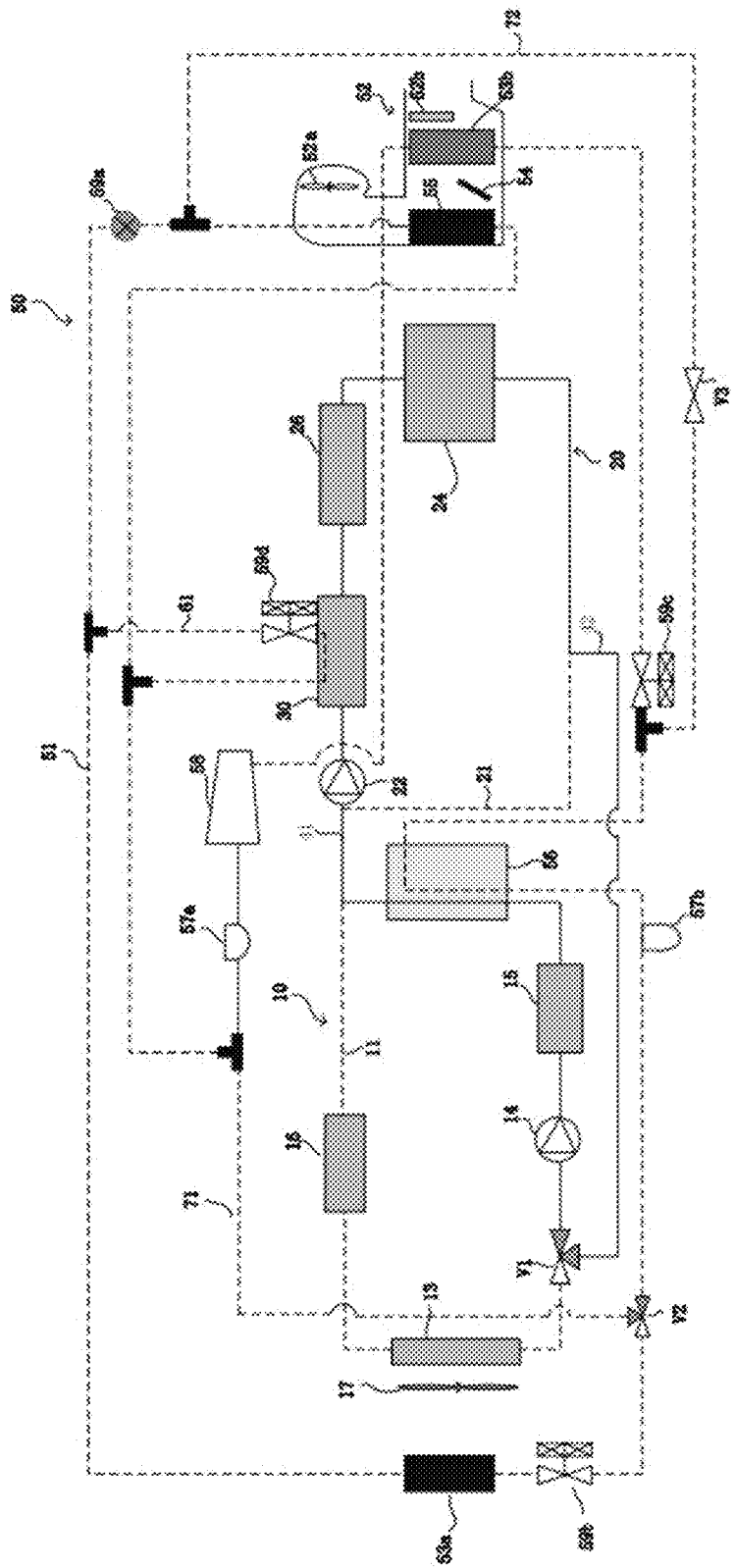
FIG. 5 is an operation state diagram illustrating that a heat management system of a vehicle heats up a battery module by using electric parts according to an exemplary embodiment of the present disclosure.

An exemplary operation in which the heat management system of the vehicle according to the exemplary embodiment of the present disclosure heats up the battery module 24 by using the electric part 15 of the vehicle will be described with reference to FIG. 5. FIG. 5 is an operation state diagram illustrating that the heat management system of the vehicle heats up the battery module by using the electric parts according to the exemplary embodiment of the present disclosure.

Referring to FIG. 5, the second cooling water connection line 42 may be opened and the partial cooling water line connected to the radiator 13 may be blocked by operating the first valve V1 to allow the integrated closed circuit in which the cooling water is circulated in both the cooling circuit 10 and the battery cooling circuit 20 to be formed.

In this state, the first pump 14 and the second pump 22 may be operated to allow the cooling water to circulate along the integrated closed circuit formed by the cooling circuit 10 and the battery cooling circuit 20. In the cooling circuit 10, the cooling water of which the temperature rises through the electric part 15 flows into the battery cooling water line 21 by passing through the first cooling water connection line 41, but does not pass the radiator 13. In the battery cooling circuit 20, the cooling water of which the temperature rises, which flows into the battery cooling water line 21 through the first cooling water connection line 41 is supplied to the battery module 24 to heat the battery module 24. Thereafter, the cooling water flows back into the cooling water line 11 through the second cooling water connection line 42.

In this state, the air-conditioner device 50 may not be operated.

When the temperature of the cooling water supplied to the battery module 24 is lower than the target temperature, the battery heater 26 may be used. The cooling water circulated through the battery module 24 is additionally heated while the battery heater 26 operates.

If the temperature of the air passing through the second condenser 53*b* is lower than the target temperature, the air heater 52*b* may be used. The air flowing into the vehicle is additionally heated while the air heater 52*b* operates.

Consequently, in the circulation process of the cooling water, a part of the cooling circuit 10 and a part of the battery cooling circuit 20 may be connected as the integrated closed circuit through the first valve V1 which is the 3-way valve, the first cooling water connection line 41, and the second cooling water connection line 42 to heat the battery module by using the waste heat of the electric part.

Figure 6:
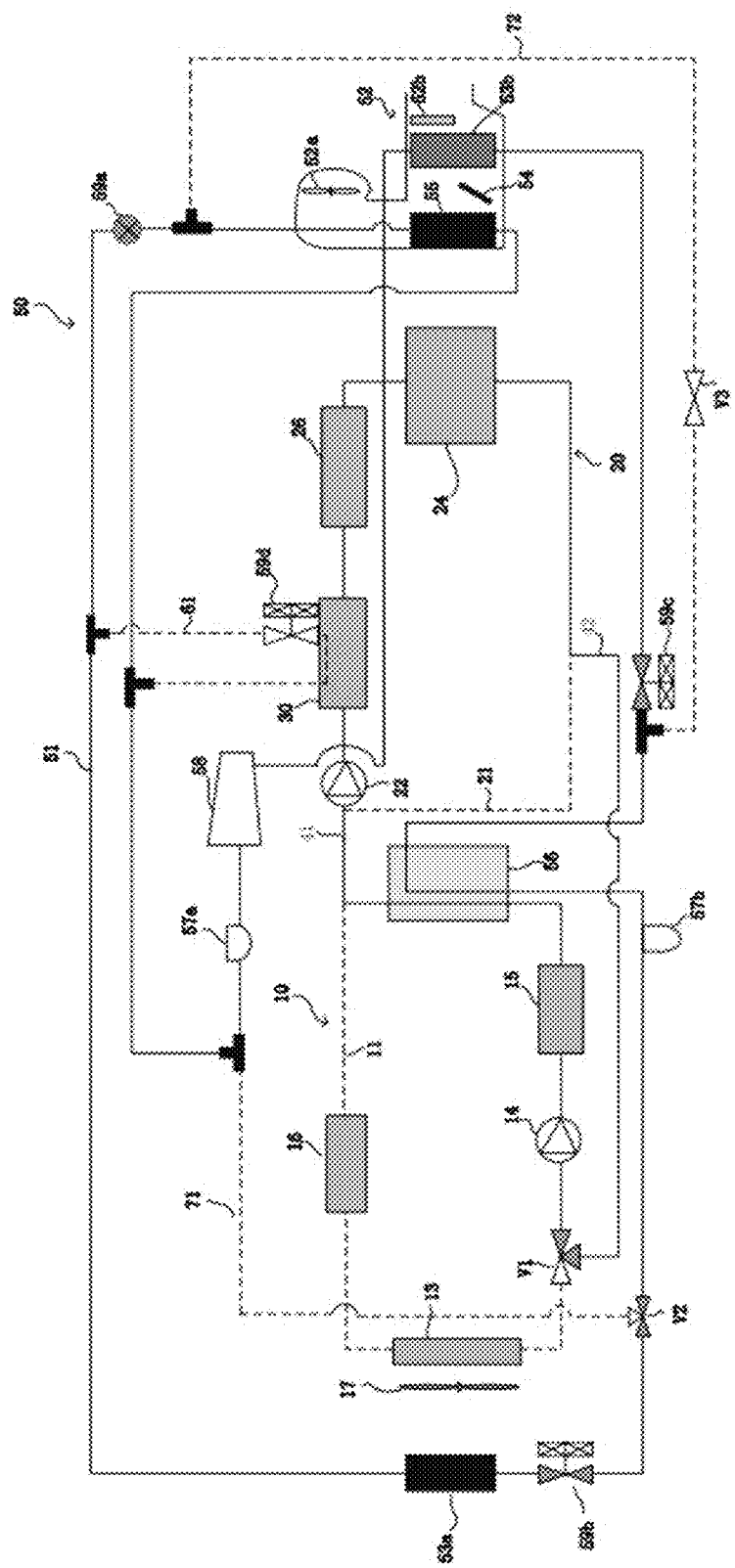
FIG. 6 is an operation state diagram illustrating that a heat management system of a vehicle heats up a battery module by using electric parts and recovers external heat in a heating mode of the vehicle according to an exemplary embodiment of the present disclosure.

An exemplary operation in which the heat management system of the vehicle according to the exemplary embodiment of the present disclosure may heat up the battery module 24 by using the electric part 15 and recover external heat in a heating mode of the vehicle will be described with reference to FIG. 6. FIG. 6 is an operation state diagram illustrating that the heat management system of the vehicle heats up the battery module by using the electric parts and recovers the external heat in the heating mode of the vehicle according to the exemplary embodiment of the present disclosure.

Referring to FIG. 6, the second cooling water connection line 42 may be opened and the partial cooling water line connected to the radiator 13 may be blocked by operating the first valve V1 to allow the integrated closed circuit in which the cooling water is circulated in both the cooling circuit 10 and the battery cooling circuit 20 to be formed.

In this state, the first pump 14 and the second pump 22 may be operated to allow the cooling water to circulate along the integrated closed circuit formed by the cooling circuit 10 and the battery cooling circuit 20. In the cooling circuit 10, the cooling water of which the temperature rises through the electric part 15 flows into the battery cooling water line 21 by passing through the first cooling water connection line 41, but does not pass the radiator 13. In the battery cooling circuit 20, the cooling water of which the temperature rises, which flows into the battery cooling water line 21 through the first cooling water connection line 41 is supplied to the battery module 24 to heat the battery module 24. Thereafter, the cooling water flows back into the cooling water line 11 through the second cooling water connection line 42.

The first bypass line 71 may be blocked and the refrigerant line connected to the first condenser 53*a* may be opened by operating the second valve V2 to supply the refrigerant supplied from the second condenser 53*b* to the first condenser 53*a*. The third valve V3 is closed to block the second bypass line 72.

In the air-conditioning device 50, the first expansion valve 59*a* may be fully opened so that the refrigerant supplied from the first condenser 53*a* to the evaporator 55 passes, but is not expanded, the second expansion valve 59*b* may be operated so that the refrigerant supplied from the internal heat exchanger 56 to the first condenser 53*a* is expanded, and the third expansion valve 59*c* may be fully opened so that the refrigerant supplied from the second condenser 53*b* to the internal heat exchanger 56 passes, but is not expanded.

The fourth expansion valve 59*d* may be closed to block the refrigerant connection line 61.

In this state, in the HVAC module 52, while the blower 52*a* is turned on, the air may flow into the HVAC module 52. At the same time, the throttle 54 controls the intake air to pass through the second condenser 53*b* after passing through the evaporator 55. When the air passes through the second condenser 53*b*, the air condenses the refrigerant, and at the same time, while the temperature of the air rises, the heated air flows into the vehicle.

Consequently, in the circulation process of the cooling water and the refrigerant, the part of the cooling circuit 10 and the part of the battery cooling circuit 20 may be connected as the integrated closed circuit through the first valve V1 which is the 3-way valve, the first cooling water connection line 41, and the second cooling water connection line 42 to heat the battery module by using the waste heat of the electric part. At the same time, while the refrigerant supplied to the first condenser 53*a* is expanded by using the second expansion valve 59*b*, and the expanded refrigerant is evaporated by the air outside the vehicle, the heat of the external air is recovered.

Figure 7:
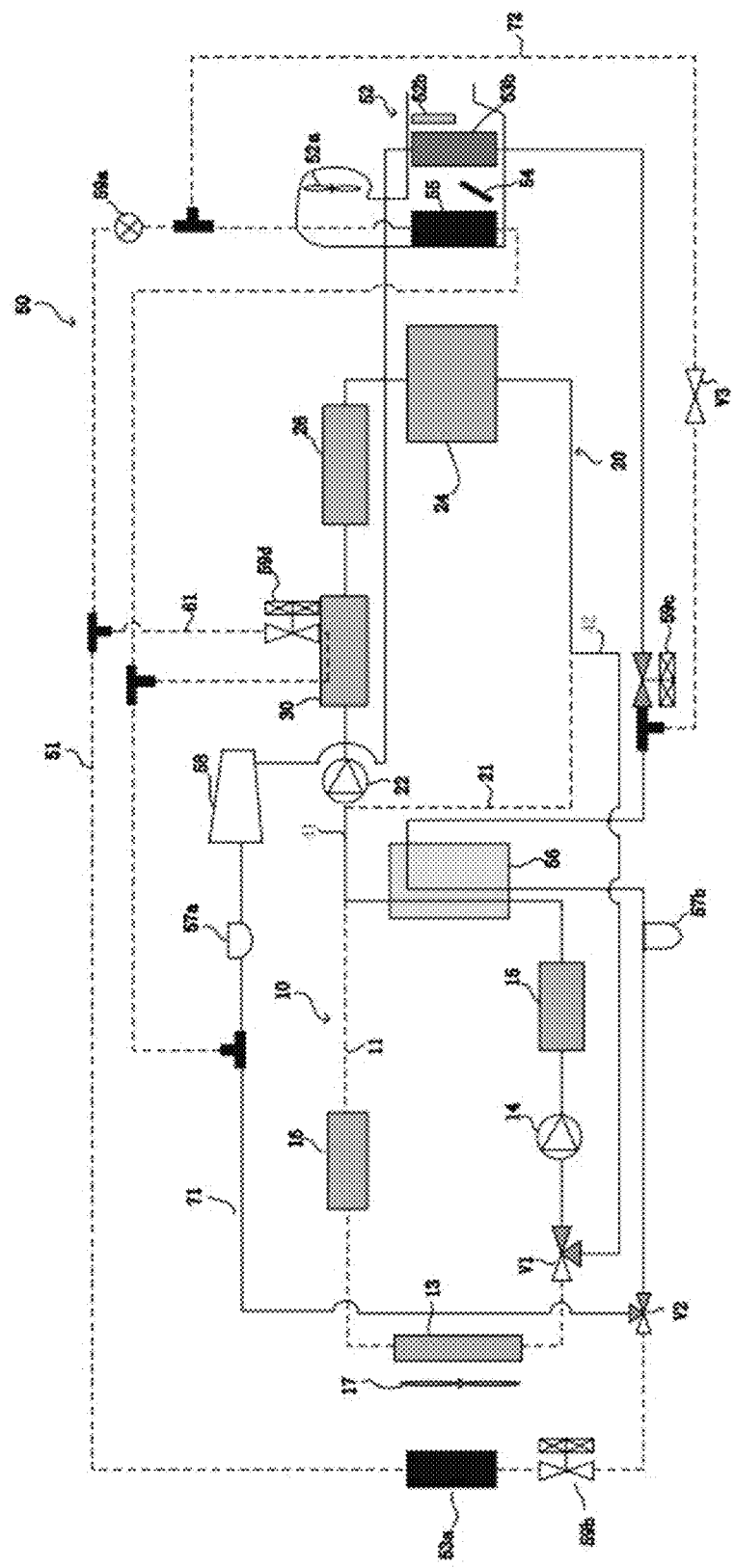
FIG. 7 is an operation state diagram illustrating that a heat management system of a vehicle heats up a battery module by using electric parts and a battery heater in a heating mode of the vehicle according to an exemplary embodiment of the present disclosure.

An exemplary operation in which the heat management system of the vehicle according to the exemplary embodiment of the present disclosure may heat up the battery module 24 by using the electric part 15 and the battery heater 26 in the heating mode of the vehicle will be described with reference to FIG. 7. FIG. 7 is an operation state diagram illustrating that the heat management system of the vehicle heats up the battery module by using the electric parts and the battery heater in the heating mode of the vehicle according to an exemplary embodiment of the present disclosure.

Referring to FIG. 7, the second cooling water connection line 42 may be opened and the partial cooling water line connected to the radiator 13 may be blocked by operating the first valve V1 to allow the integrated closed circuit in which the cooling water is circulated in both the cooling circuit 10 and the battery cooling circuit 20 to be formed.

In this state, the first pump 14 and the second pump 22 may be operated to allow the cooling water to circulate along the integrated closed circuit formed by the cooling circuit 10 and the battery cooling circuit 20. In the cooling circuit 10, the cooling water of which the temperature rises through the electric part 15 flows into the battery cooling water line 21 by passing through the first cooling water connection line 41, but does not pass the radiator 13. In the battery cooling circuit 20, the cooling water of which the temperature rises, which flows into the battery cooling water line 21 through the first cooling water connection line 41 is supplied to the battery module 24 to heat the battery module 24. Thereafter, the cooling water flows back into the cooling water line 11 through the second cooling water connection line 42. When the temperature of the cooling water supplied to the battery module 24 is lower than the target temperature, the battery heater 26 may be used. The cooling water passing through the battery module 24 is additionally heated by operating the battery heater 26.

The first bypass line 71 may be opened and the refrigerant line connected to the first condenser 53a may be blocked by operating the second valve V2 to supply the refrigerant supplied from the second condenser 53b to the liquid storage tank 57a through the first bypass line 71, and not to supply the refrigerant to the first condenser 53a. The third valve V3 is closed to block the second bypass line 72.

In the air-conditioning device 50, the first expansion valve 59a may be closed, the second expansion valve 59b may be closed, and the third expansion valve 59c may be fully opened so that the refrigerant supplied from the second condenser 53b to the internal heat exchanger 56 passes, but is not expanded.

The fourth expansion valve 59d may be closed to block the refrigerant connection line 61.

High-temperature and high-pressure refrigerant compressed by the compressor 58 may be supplied to the second condenser 53b. In this state, in the HVAC module 52, while the blower 52a is turned on, the air flows into the HVAC module 52. At the same time, the throttle 54 controls the intake air to pass through the second condenser 53b after passing through the evaporator 55. When the air passes through the second condenser 53b, the air condenses the refrigerant, and at the same time, while the temperature of the air rises, the heated air flows into the vehicle. If the temperature of the air passing through the second condenser 53b is lower than the target temperature, the air heater 52b may be used. The air flowing into the vehicle is additionally heated by operating the air heater 52b.

Consequently, in the circulation process of the cooling water and the refrigerant, the part of the cooling circuit 10 and the part of the battery cooling circuit 20 may be connected as the integrated closed circuit through the first valve V1 which is the 3-way valve, the first cooling water connection line 41, and the second cooling water connection line 42 to heat the battery module by using the waste heat of the electric part.

Figure 8:
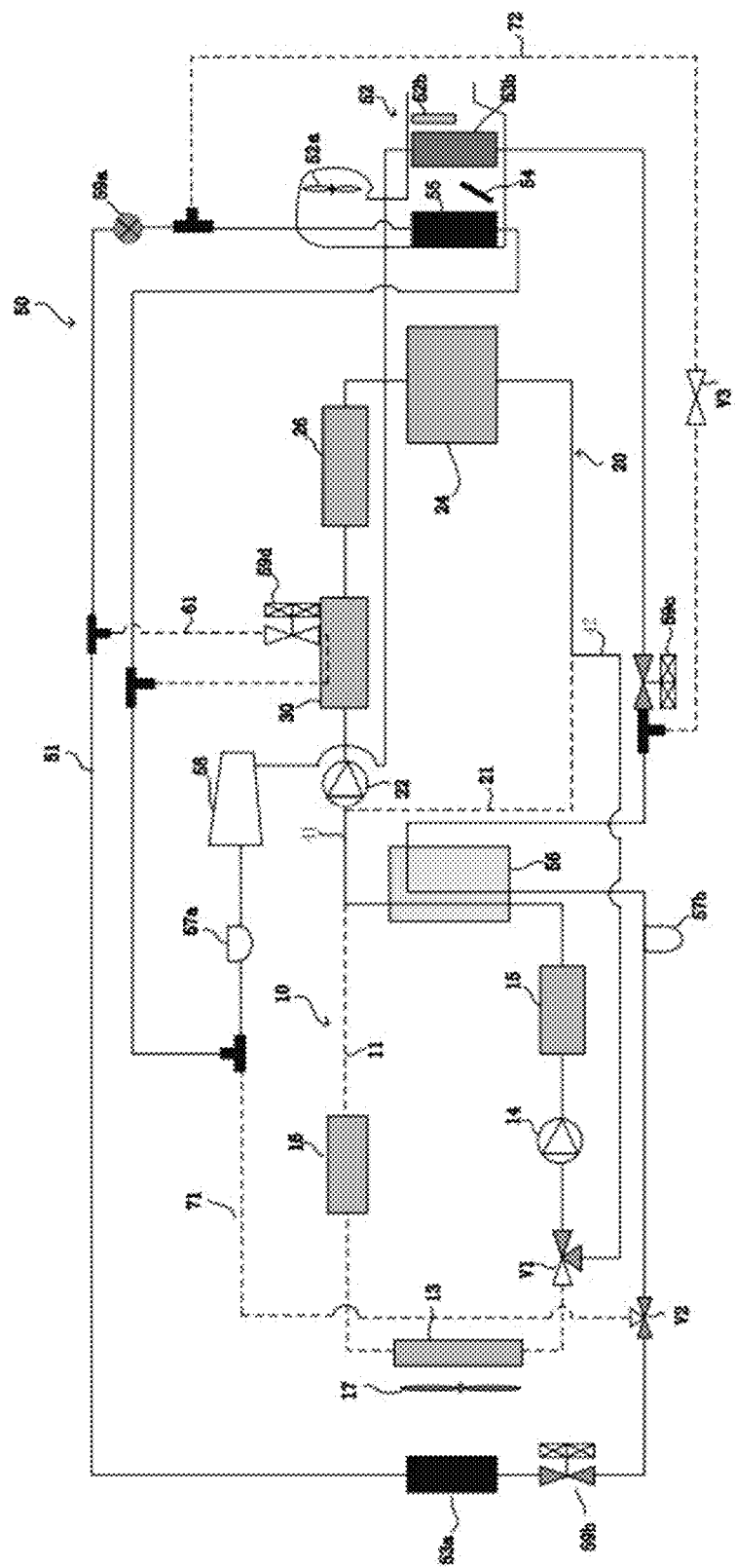
FIG. 8 is an operation state diagram illustrating that a heat management system of a vehicle heats up a battery module by using electric parts and recovers external heat in a heating and dehumidification mode of the vehicle according to an exemplary embodiment of the present disclosure.

An exemplary operation in which the heat management system of the vehicle according to the exemplary embodiment of the present disclosure may heat up the battery module 24 by using the electric part 15 and recover the external heat in a heating and dehumidification mode of the vehicle will be described with reference to FIG. 8. FIG. 8 is an operation state diagram illustrating that the heat management system of the vehicle heats up the battery module by using the electric parts and recovers the external heat in the heating and dehumidification mode of the vehicle according to the exemplary embodiment of the present disclosure.

Referring to FIG. 8, the second cooling water connection line 42 may be opened and the partial cooling water line connected to the radiator 13 may be blocked by operating the first valve V1 to allow the integrated closed circuit in which the cooling water is circulated in both the cooling circuit 10 and the battery cooling circuit 20 to be formed.

In this state, the first pump 14 and the second pump 22 may be operated to allow the cooling water to circulate along the integrated closed circuit formed by the cooling circuit 10 and the battery cooling circuit 20. In the cooling circuit 10, the cooling water of which the temperature rises through the electric part 15 flows into the battery cooling water line 21 by passing through the first cooling water connection line 41, but does not pass the radiator 13. In the battery cooling circuit 20, the cooling water of which the temperature rises, which flows into the battery cooling water line 21 through the first cooling water connection line 41 is supplied to the battery module 24 to heat the battery module 24. Thereafter, the cooling water flows back into the cooling water line 11 through the second cooling water connection line 42.

The first bypass line 71 may be blocked and the refrigerant line connected to the first condenser 53a is opened by operating the second valve V2 to supply the refrigerant supplied from the second condenser 53b to the first condenser 53a. The third valve V3 is closed to block the second bypass line 72.

In the air-conditioning device 50, the first expansion valve 59a may be operated so that the refrigerant supplied from the first condenser 53a to the evaporator 55 is expanded, the second expansion valve 59b may be operated so that the refrigerant supplied from the internal heat exchanger 56 to the first condenser 53a is expanded, and the third expansion valve 59c may be fully opened so that the refrigerant supplied from the second condenser 53b to the internal heat exchanger 56 passes, but is not expanded.

The fourth expansion valve 59d may be closed to block the refrigerant connection line 61.

In this state, in the HVAC module 52, while the blower 52a is turned on, the air may flow into the HVAC module 52. At the same time, the throttle 54 controls the intake air to pass through the second condenser 53b after passing through the evaporator 55. When the air dried by the evaporator condenses the refrigerant when passing through the second condenser 53b, and at the same time, while the temperature of the air rises, the dried and heated air flows into the vehicle.

Consequently, in the circulation process of the cooling water and the refrigerant, the part of the cooling circuit 10 and the part of the battery cooling circuit 20 may be connected as the integrated closed circuit through the first valve V1 which is the 3-way valve, the first cooling water connection line 41, and the second cooling water connection line 42 to heat the battery module by using the waste heat of the electric part. At the same time, while the refrigerant supplied to the first condenser 53a is expanded by using the second expansion valve 59b, and the expanded refrigerant is evaporated by the air outside the vehicle, the heat of the external air is recovered.

Figure 9:
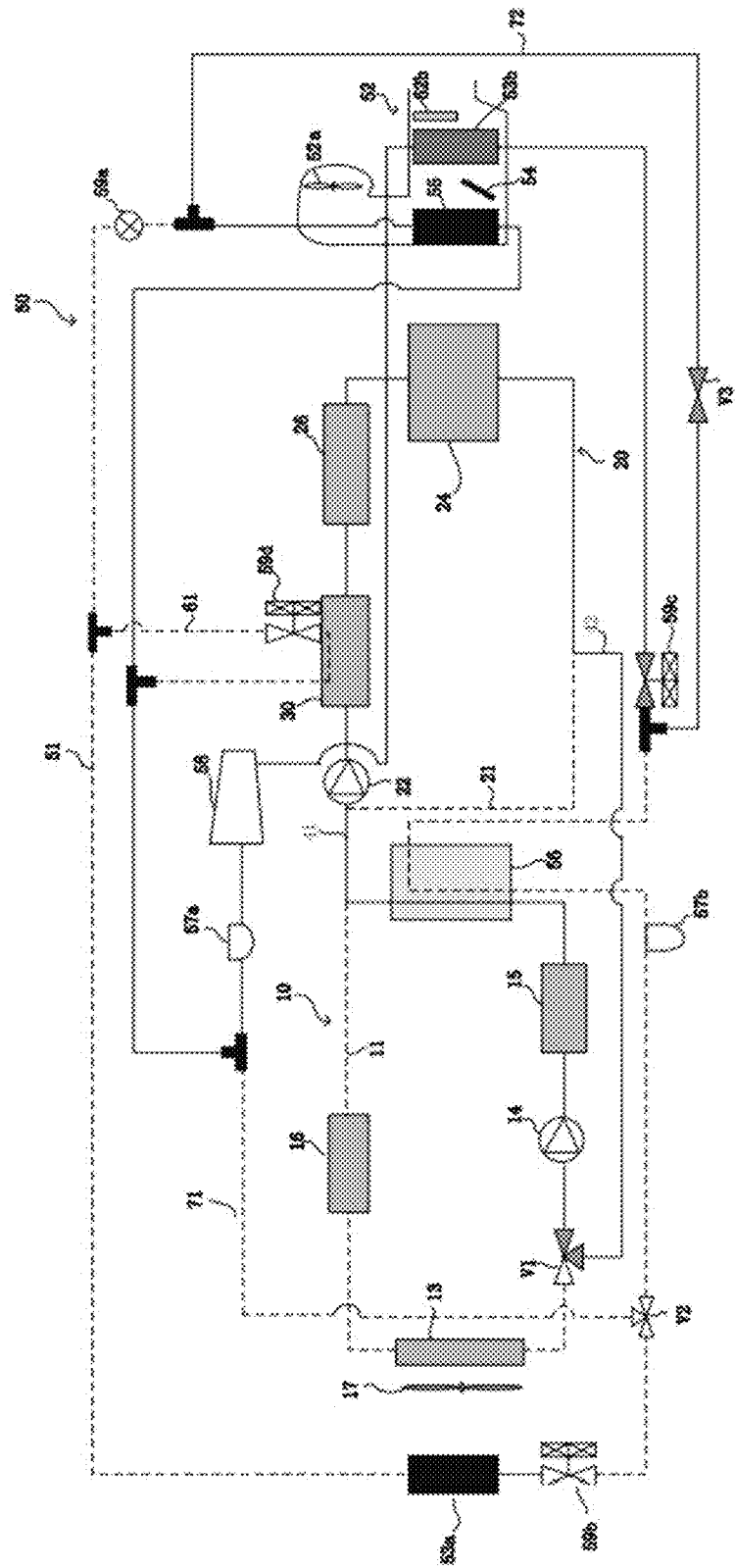
FIG. 9 is an operation state diagram illustrating that a heat management system of a vehicle heats up a battery module by using electric parts and a battery heater in a heating and dehumidification mode of the vehicle according to an exemplary embodiment of the present disclosure.

An exemplary operation in which the heat management system of the vehicle according to the exemplary embodiment of the present disclosure may heat up the battery module 24 by using the electric part 15 and the battery heater 26 in the heating and dehumidification mode of the vehicle will be described with reference to FIG. 9. FIG. 9 is an operation state diagram illustrating that the heat management system of the vehicle heats up the battery module by using the electric parts and the battery heater in the heating and dehumidification mode of the vehicle according to the exemplary embodiment of the present disclosure.

Referring to FIG. 9, the second cooling water connection line 42 may be opened and the partial cooling water line connected to the radiator 13 may be blocked by operating the first valve V1 to allow the integrated closed circuit in which the cooling water is circulated in both the cooling circuit 10 and the battery cooling circuit 20 to be formed.

In this state, the first pump 14 and the second pump 22 may be operated to allow the cooling water to circulate along the integrated closed circuit formed by the cooling circuit 10 and the battery cooling circuit 20. In the cooling circuit 10, the cooling water of which the temperature rises through the electric part 15 flows into the battery cooling water line 21 by passing through the first cooling water connection line 41, but does not pass the radiator 13. In the battery cooling circuit 20, the cooling water of which the temperature rises, which flows into the battery cooling water line 21 through the first cooling water connection line 41 is supplied to the battery module 24 to heat the battery module 24. Thereafter, the cooling water flows back into the cooling water line 11 through the second cooling water connection line 42. When the temperature of the cooling water supplied to the battery module 24 is lower than the target temperature, the battery heater 26 may be used. The cooling water passing through the battery module 24 is additionally heated by operating the battery heater 26.

By operating the second valve V2, the first bypass line 71 may be blocked, and the refrigerant line connected to the first condenser 53a and the internal heat exchanger 56 may be blocked. The third valve V3 is opened so that the second bypass line 72 is opened.

In the air-conditioning device 50, the first expansion valve 59a may be closed, the second expansion valve 59b may be closed, and the third expansion valve 59c may be operated so that the refrigerant supplied from the second condenser 53b is expanded. In this case, the refrigerant supplied from the second condenser 53b passes through the third expansion valve 59c, and then is supplied to the evaporator 55 through the opened second bypass line 72.

The fourth expansion valve 59d may be closed to block the refrigerant connection line 61.

In this state, in the HVAC module 52, while the blower 52a is turned on, the air may flow into the HVAC module 52. At the same time, the throttle 54 controls the intake air to pass through the second condenser 53b after passing through the evaporator 55. When the air dried by the evaporator condenses the refrigerant when passing through the second condenser 53b, and at the same time, while the temperature of the air rises, the dried and heated air flows into the vehicle. If the temperature of the air passing through the second condenser 53b is lower than the target temperature, the air heater 52b may be used. The air flowing into the vehicle is additionally heated by operating the air heater 52b.

Consequently, in the circulation process of the cooling water and the refrigerant, the part of the cooling circuit 10 and the part of the battery cooling circuit 20 may be connected as the integrated closed circuit through the first valve V1 which is the 3-way valve, the first cooling water connection line 41, and the second cooling water connection line 42 to heat the battery module by using the waste heat of the electric part.

As illustrated in FIG. 10, the heat management system of the vehicle according to another exemplary embodiment of the present disclosure, the liquid storage tank 16 may be installed on the first cooling water connection line 41. In this state, the operation of the heat management system of the vehicle is described above, so detailed description is omitted.

As illustrated in FIG. 11, in the heat management system of the vehicle according to yet another exemplary embodiment of the present disclosure, the first valve V1 which is the 3-way valve may be replaced with the fourth valve V4 and the fifth valve V5 which are two opening/closing valves. In the mode where the electric part 15 and the battery module 24 are cooled through the cooling circuit 10 and the battery cooling circuit 20, the fourth valve V4 is opened and the fifth valve V5 is closed such that the independent closed circuit is formed in which the cooling water is circulated in each of the cooling circuit 10 and the battery cooling circuit 20. In the mode where the battery module 24 is heated by using the waste heat of the electric part 15, the fourth valve V4 is closed and the fifth valve V5 is opened such that the integrated closed circuit is formed in which the cooling water is circulated in both the cooling circuit 10 and the battery cooling circuit 20. In two states, other operations of the heat management system of the vehicle are described above, so detailed description is omitted.

Further, low-temperature AER (a cruising driving distance of the electric vehicle) of the vehicle using the heat management system according to various exemplary embodiments may be tested. Table 1 shows a test result of Comparative Examples 1 to 3 using each heat management system in the related art and Example 1 using the heat management system according to the exemplary embodiment of the present disclosure.

In a test condition, the vehicle may be left for 12 hours in an environment of −7° C., and may be driven under a condition of CLTC-P (cruising driving distance test criterion), and an initial battery temperature may be −3° C. and a driver's seat temperature may be maintained at 20 to 22° C. A test terminates when a CLTC analysis may not be done. Hereinafter, a test result will be described with reference to Table 1.

TABLE 1

|  | Comparative Example 1 | Comparative Example 2 | Comparative Example 3 | Example 1 |
|---|---|---|---|---|
| Vehicle condition | 3-way valve is provided | 3-way valve is not provided, and heating/temperature rise logic is executed when battery temperature is lower than −5° C., and is not executed when battery temperature is higher than 5° C. | 3-way valve is not provided, and heating/temperature rise logic is executed when battery temperature is lower than 5° C., and is not executed when battery temperature is higher than 15° C. | heating/temperature rise logic is executed when battery temperature is lower than −5° C., and is not executed when battery temperature is higher than 5° C. |
| Heater operation state | Heater is not used in total driving process | Heater is not used in total driving process | When SOC is 35% or higher, heater is used. | Heater is not used in total driving process |
| Final battery temperature | −3 → 6° C. | −3 → 2° C. | −3 → 10° C. | −3 → 13° C. |
| Battery electricity amount | 57.6 kWh (Reference: 64.8 kWh, 11% decreases) | 55.2 kWh Reference: 64.8 kWh, 15% decreases) | 59.033 kWh Reference: 64.8 kWh, 8.9% decreases) | 60.555 kWh Reference: 64.8 kWh, 6.6% decreases) |

TABLE 1-continued

|  | Comparative Example 1 | Comparative Example 2 | Comparative Example 3 | Example 1 |
|---|---|---|---|---|
| Driving AER | 272.2 km (room temperature AER 560 km, 51% decreases) | 259 km (room temperature AER 560 km, 54% decreases) | 283.4 km (room temperature AER 560 km, 49% decreases) | 288 km (room temperature AER 560 km, 48.6% decreases) |

Figure 12:
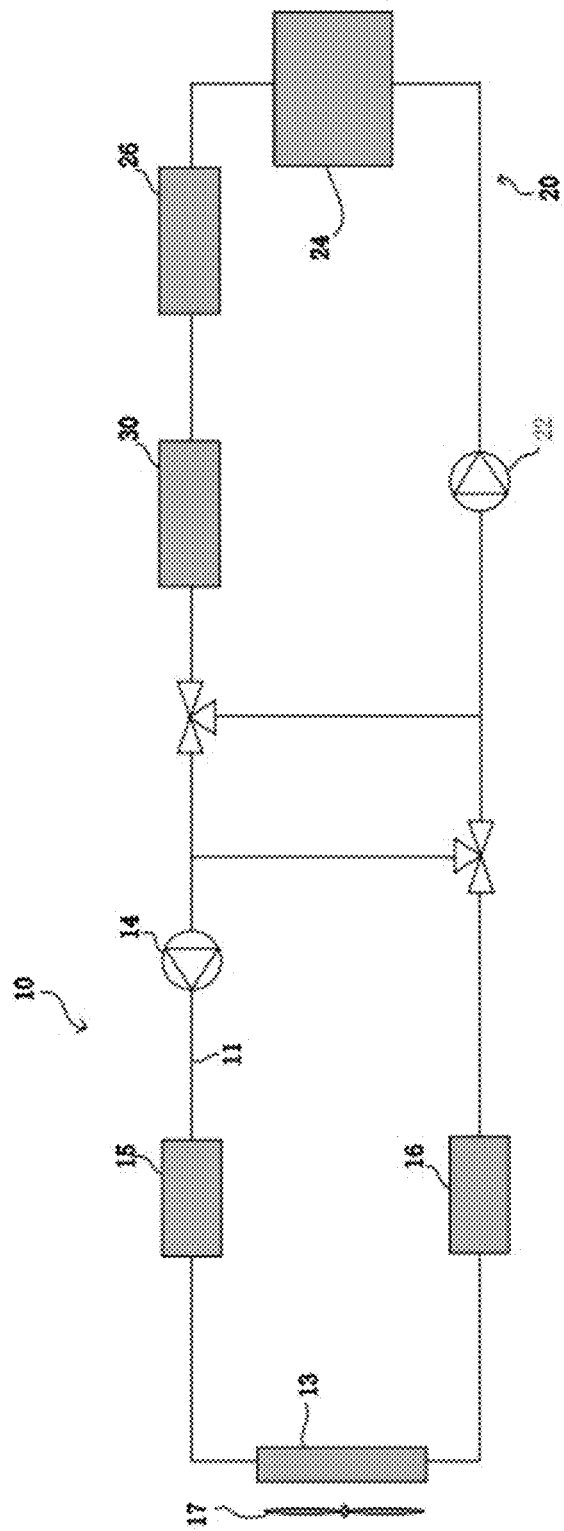
FIG. 12 is a partial schematic view illustrating a heat management system of a vehicle in the related art.

As shown in Table 1, Comparative Example 1 is a cooling system according to the heat management system of the vehicle in the related art illustrated in FIG. 12. According to Comparative Example 1, two 3-way valves are used, and the cooling circuit and the battery cooling circuit are connected as the integrated closed circuit through operation of the two 3-way valves to heat up the battery module by using the waste heat of the electric part. The cooling water heated by the electric part 15 in the cooling circuit 10 is cooled through the radiator 13, and then is supplied to the battery cooling circuit 20 to heat the battery module 24. In this scheme, the battery module 24 is heated by using the waste heat of the electric part 15, but the cooling water heated by the electric part 15 passes through the radiator 13, so heat is lost, and as a result, a heating effect is not ideal.

Both Comparative Examples 2 and 3 do not use the 3-way valve. That is, the battery module is heated only by the battery heater, and the waste heat of the electric part is not used. A difference between two methods is that a temperature rise logic of the battery heater is different.

In the heat management system of the vehicle according to the exemplary embodiment of the present disclosure, during a test process, the battery heater may not be used and only the waste heat of the electric part may be used to heat the battery module. As can be seen from Table 1, in the vehicle to which the heat management system of the vehicle according to the exemplary embodiment of the present disclosure is applied, the battery heating effect is most excellent. The battery temperature rises from −3° C. to 13° C. As compared with a reference battery electricity amount, reduction of the battery electricity amount is the smallest and reduction of a room temperature AER is the smallest. As compared with heating the battery module with the battery heater, in the exemplary embodiment of the present disclosure, battery temperature rising efficiency increases by 23.1%, the battery electricity amount increases by 2.6%, and the driving AER of the vehicle increases by 1.6%. As compared with heating the battery module by using the waste heat of the electric part dissipated through the radiator, the battery temperature rising efficiency of the present disclosure increases by 77.8%, the battery electricity amount increases by 5.1%, and the driving AER of the vehicle increases by 5.6%.

In the heat management system of the vehicle according to the exemplary embodiment of the present disclosure, the cooling circuit and the battery cooling circuit may be connected as the integrated closed circuit through one 3-way valve to heat the battery module by using the waste heat of the electric parts, thereby enhancing heating efficiency. Further, the battery module is cooled by using the chiller to effectively adjust the temperature of the battery module. The performance of the battery module can be optimized by effectively adjusting the temperature of the battery module, and the total driving distance of the vehicle can be increased through effective management for the battery module.

As compared with a technical method for heating the battery module by using the waste heat of the electric part by connecting the cooling circuit and the battery cooling circuit as the integrated closed circuit by using the 4-way valve, the minimum heat loss may be implemented by using the waste heat of the electric part maximally in the present disclosure.

Further, the heat management system of the vehicle according to the exemplary embodiment of the present disclosure may also enhance the heating efficiency by using recovering the heat of the external air.

In the exemplary embodiment of the present disclosure, each of the operations may be executed through a controller, and the controller may be connected to the heat management system of the vehicle to control the operation of the heat management system of the vehicle. The controller may be a vehicle controller or a controller separately installed in the heat management system of the vehicle, and the controller is configured to control the operation of each member of the heat management system of the vehicle according to modes such as cooling, heating, and heating and dehumidification of the vehicle.

Further, the controller may be a hardware device including a memory and a processor, and the processor may be configured to execute one or one or more steps interpreted in an algorithm structure. The memory stores an algorithm step, and the processor executes an algorithm step to execute one or one or more processes of the method according to each exemplary embodiment of the present disclosure. The controller according to the exemplary embodiment of the present disclosure may be implemented by a non-volatile memory and a processor. The non-volatile memory is configured to store an algorithm for controlling the operation of each assembly of the vehicle or data regarding a software command for executing the algorithm. The processor is configured to execute the operation by using the data stored in the memory. The memory and the processor may be separate chips. The memory and the processor may be integrated into a single chip. The processor may be implemented by one or a plurality of processors.

The controller may be at least one microprocessor which operates by a predetermined program, and the predetermined program may include a series of commands for executing the method opened in each exemplary embodiment of the present disclosure.

The present disclosure may be implemented as a computer readable code of a computer readable recording medium. The computer readable recording medium may be a predetermined data storage device capable of storing data, and thereafter, the data may be read by a computer system. An example of the computer readable recording medium is a hard disk (HDD), a Solid State Drive (SSD), a Silicon Disk Drive (SDD) type, a read-only memory (ROM), a random access memory (RAM), a CD-ROM, a magnetic memory, a floppy disk, an optical data storage device, etc., and is implemented as a carrier (e.g., transmission through the Internet).

The description of the specific embodiment of the present disclosure is intended to explain the present disclosure. The description described above is not intended to illustrate all the exemplary embodiments of the present disclosure, or to limit the present disclosure to the exact embodiment that is disclosed, and it is clear that various modifications and changes can be made according to the revelation described above. The selection of an exemplary embodiment is to be interpreted by the specific principle of the present disclosure and the actual application of the present disclosure, so that the person with the knowledge of the present field can use each embodiment of the present disclosure and the different alternative forms and modifications thereof. The scope of the present disclosure is limited by the appended claims and a form equivalent thereto.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A heat management system of a vehicle, comprising:
a cooling circuit comprising a radiator, a first valve, a first pump, and at least one electric part which are connected through a cooling water line to cool the at least one electric part installed on the cooling water line through cooling water circulated in the cooling water line;
a battery cooling circuit comprising a second pump and a battery module which are connected through a battery cooling water line to cool the battery module installed on the battery cooling water line through the cooling water circulated in the battery cooling water line;
a chiller installed in the battery cooling water line between the second pump and the battery module and connected to a refrigerant line of an air-conditioning device through a refrigerant connection line to adjust a temperature of the cooling water through heat exchange between the cooling water supplied from the battery cooling water line and the refrigerant supplied from the air-conditioning device through the refrigerant connection line;
a first cooling water connection line having a first end connected to the cooling water line between the at least one electric part and the radiator and a second end connected to the battery cooling water line between the battery module and the second pump to allow the cooling water passing through the at least one electric part to flow into the battery cooling water line through the battery cooling water line; and
a second cooling water connection line having a first end connected to the battery cooling water line between the battery module and the second pump and a second end connected to the first valve to allow the cooling water passing through the battery module to flow into the cooling water line through the first valve,
wherein the first valve is a 3-way valve and is installed on the cooling water line between the radiator and the first pump to form an independent closed circuit in which the cooling water is circulated in each of the cooling circuit and the battery cooling circuit or an integrated closed circuit in which the cooling water is circulated in both the cooling circuit and the battery cooling circuit by operation of the first valve.

2. The heat management system of claim 1, wherein the air-conditioning device comprises a first expansion valve, an HVAC module, a compressor, a second expansion valve, and a first condenser which are connected through the refrigerant line.

3. The heat management system of claim 2, wherein the HVAC module comprises an evaporator, a second condenser, a throttle, and a blower, wherein the evaporator is installed in the refrigerant line downstream of the first expansion valve, the second condenser is installed in the refrigerant line downstream of the compressor, and the throttle is configured to allow air introduced through the blower to selectively pass through the second condenser or not to pass through the second condenser after passing through the evaporator, and
wherein the first condenser is installed on the refrigerant line between the second condenser and the evaporator,
the compressor is installed on the refrigerant line between the evaporator and the second condenser,
the first expansion valve is installed on the refrigerant line between the first condenser and the evaporator so as to selectively expand the refrigerant supplied to the evaporator, and
the second expansion valve is installed on the refrigerant line upstream of the first condenser so as to selectively expand the refrigerant supplied to the first condenser.

4. The heat management system of claim 3, further comprising:
an internal heat exchanger installed on the refrigerant line between the second condenser and the second expansion valve, and installed on the cooling water line between the at least one electric part and the radiator; and
a third expansion valve installed on the refrigerant line between the second condenser and the internal heat exchanger so as to selectively expand the refrigerant passing through the third expansion valve.

5. The heat management system of claim 4, wherein the air-conditioner device further comprises:
a second valve which is a 3-way valve and is installed on the refrigerant line between the second condenser and the second expansion valve,
a first bypass line having a first end connected to the refrigerant line between the second condenser and the second expansion valve through the second valve and a second end connected to the refrigerant line between the evaporator and the compressor,
a second bypass line having a first end connected to the refrigerant line between the third expansion valve and the internal heat exchanger and a second end connected to the refrigerant line between the first expansion valve and the evaporator, and
a third valve installed on the second bypass line.

6. The heat management system of claim 5, wherein a first end of the refrigerant connection line is connected to the refrigerant line between the first condenser and the first expansion valve, and a second end of the refrigerant connection line is connected to the refrigerant line between the evaporator and the compressor,
wherein the heat management system further comprises a fourth expansion valve installed on the refrigerant connection line, and
wherein the fourth expansion valve expands the refrigerant introduced into the chiller or is selectively closed to prevent the refrigerant from being introduced into the chiller.

7. The heat management system of claim 6, wherein the battery cooling circuit further comprises a battery heater installed on the battery cooling water line between the second pump and the battery module, and wherein the cooling circuit further comprises a liquid storage tank installed on the cooling water line between the at least one electric part and the radiator.

8. The heat management system of claim 1, wherein, when the battery module is heated by using the at least one electric part,
the first valve is configured to operate to open the second cooling water connection line and to block the cooling water line connected to the radiator, thereby forming the integrated closed circuit in which the cooling water is circulated in both the cooling circuit and the battery cooling circuit,
the first pump and the second pump are configured to operate to circulate the cooling water along the integrated closed circuit formed by the cooling circuit and the battery cooling circuit, and
the cooling water is configured to be supplied to the battery module, along the cooling water line, the first cooling water connection line, and the battery cooling water line, to heat the battery module.

9. The heat management system of claim 7, wherein, when the battery module is heated by using the at least one electric part and the battery heater,
the first valve is configured to operate to open the second cooling water connection line and to block the cooling water line connected to the radiator, thereby forming the integrated closed circuit in which the cooling water is circulated in both the cooling circuit and the battery cooling circuit,
the first pump and the second pump are configured to operate to circulate the cooling water along the integrated closed circuit formed by the cooling circuit and the battery cooling circuit,
the battery heater is configured to operate to heat the cooling water circulated through the battery cooling water line, and
the cooling water is configured to be supplied to the battery module, along the cooling water line, the first cooling water connection line, and the battery cooling water line, to heat the battery module.

10. The heat management system of claim 6, wherein, when the at least one electric part and the battery module are cooled,
the first valve is configured to operate to block the second cooling water connection line to open the cooling water line connected to the radiator, thereby forming the independent closed circuit in which the cooling water is circulated in each of the cooling circuit and the battery cooling circuit,
the second valve is configured to operate to block the first bypass line and to open the refrigerant line connected to the first condenser,
the third valve is configured to close and block the second bypass line,
in the cooling circuit, the first pump is configured to operate to circulate the cooling water along the cooling water line,
in the battery cooling circuit, the second pump is configured to operate to circulate the cooling water along the battery cooling water line,
the first expansion valve is configured to close, the second expansion valve is configured to fully open, and the third expansion valve is configured to operate to expand the refrigerant supplied to the internal heat exchanger via the second condenser, and the fourth expansion valve is configured to operate to expand the refrigerant supplied to the chiller through the refrigerant connection line.

11. The heat management system of claim 6, wherein, when the at least one electric part and the battery module are cooled in a cooling mode of the vehicle,
the first valve is configured to operate to block the second cooling water connection line and to open the cooling water line connected to the radiator, thereby forming the independent closed circuit in which the cooling water is circulated in each of the cooling circuit and the battery cooling circuit,
the second valve is configured to operate to block the first bypass line and to open the refrigerant line connected to the first condenser,
the third valve is configured to close to block the second bypass line,
in the cooling circuit, the first pump is configured to operate to circulate the cooling water along the cooling water line,
in the battery cooling circuit, the second pump is configured to operate to circulate the cooling water along the battery cooling water line,
the first expansion valve is configured to operate to expand the refrigerant supplied to the evaporator via the first condenser, the second expansion valve configured to fully open, the third expansion valve is configured to operate to expand the refrigerant supplied to the internal heat exchanger via the second condenser, and the fourth expansion valve is configured to operate to expand the refrigerant supplied to the chiller through the refrigerant connection line.

12. The heat management system of claim 6, wherein, when the battery module is heated by using the at least one electric part and a vehicle cabin is heated by recovering external heat in a heating mode of the vehicle,
first valve is configured to operate to open the second cooling water connection line and to block the cooling water line connected to the radiator, thereby forming the integrated closed circuit in which the cooling water is circulated in both the cooling circuit and the battery cooling circuit,
the second valve is configured to operate to block the first bypass line and to open the refrigerant line connected to the first condenser,
the third valve is configured to close to block the second bypass line,
the first pump and the second pump are configured to operate to circulate the cooling water along the integrated closed circuit formed by the cooling circuit and the battery cooling circuit, and
the first expansion valve is configured to fully open, the second expansion valve is configured to operate to expand the refrigerant supplied to the first condenser from the internal heat exchanger, the third expansion valve is configured to fully open, and the fourth expansion valve is configured to close.

13. The heat management system of claim 7, wherein, when the battery module is heated by using the at least one electric part and the battery heater in a heating mode of the vehicle,
the first valve is configured to operate to open the second cooling water connection line and to block the cooling water line connected to the radiator, thereby forming the integrated closed circuit in which the cooling water is circulated in both the cooling circuit and the battery cooling circuit, the second valve is configured to operate to open the first bypass line and to supply the refrigerant passing through the internal heat exchanger operating-tb to the compressor through the first bypass line, the third valve is configured to close to block the second bypass line, the first pump and the second pump are configured to operate to circulate the cooling water along the integrated closed circuit formed by the cooling circuit and the battery cooling circuit, and the first expansion valve is configured to close, the second expansion valve is configured to close, the third expansion valve is configured to fully open, and the fourth expansion valve is configured to close.

14. The heat management system of claim 6, wherein, when the battery module is heated by using the at least one electric part and a vehicle cabin is heated by recovering external heat in a heating and dehumidification mode of the vehicle, the first valve is configured to operate to open the second cooling water connection line and to block the cooling water line connected to the radiator, thereby forming the integrated closed circuit in which the cooling water is circulated in both the cooling circuit and the battery cooling circuit, the second valve is configured to operate to block the first bypass line, the third valve is configured to close to block the second bypass line, the first pump and the second pump are configured to operate to circulate the cooling water along the integrated closed circuit formed by the cooling circuit and the battery cooling circuit, and the first expansion valve is configured to operate to expand the refrigerant supplied to the evaporator via the first condenser, the second expansion valve is configured to operate to expand the refrigerant supplied from the internal heat exchanger to the first condenser, the third expansion valve is configured to fully open, and the fourth expansion valve is configured to close.

15. The heat management system of claim 7, wherein, when the battery module is heated by using the at least one electric part and the battery heater in a heating and dehumidification mode of the vehicle, the first valve is configured to operate to open the second cooling water connection line and to block a partial cooling water line connected to the radiator, thereby forming the integrated closed circuit in which the cooling water is circulated in both the cooling circuit and the battery cooling circuit, the second valve is configured to operate to block the first bypass line and to block the refrigerant line connected to the first condenser, the third valve is configured to open to supply the refrigerant supplied via the second condenser to the evaporator through the second bypass line, the first pump and the second pump are configured to operate to circulate the cooling water along the integrated closed circuit formed by the cooling circuit and the battery cooling circuit, the first expansion valve is configured to close, the second expansion valve is configured to close, the third expansion valve is configured to operate to expand the refrigerant passing through the second condenser, and the fourth expansion valve is configured to close.

16. The heat management system of claim 1, wherein the HVAC module further comprises an air heater configured to selectively heat the air introduced into the vehicle.

17. The heat management system of claim 1, wherein the at least one electric part comprises a power control unit, a motor, an inverter, or an on-board charger.

18. A vehicle comprising the heat management system of claim 1.

* * * * *